US012662420B2

(12) United States Patent
Poelma et al.

(10) Patent No.: US 12,662,420 B2
(45) Date of Patent: Jun. 23, 2026

(54) CEMENT COMPOSITIONS WITH 3D GRAPHENE CARBONS

(71) Applicant: Lyten, Inc., San Jose, CA (US)

(72) Inventors: Saemi Oh Poelma, Sunnyvale, CA (US); Salik Khan, Santa Clara, CA (US); Peter J. Boul, Emerald Hills, CA (US); Margaret Hines, San Jose, CA (US); Anne Ruminski, Redwood City, CA (US); Jacques F. Nicole, Palo Alto, CA (US); Daniel Cook, Woodside, CA (US); Michael W. Stowell, Sunnyvale, CA (US); Bruce Lanning, Littleton, CO (US); Matthew Jubinsky, Fremont, CA (US)

(73) Assignee: Lyten, Inc., San Jose, CA (US)

( * ) Notice: Subject to any disclaimer, the term of this patent is extended or adjusted under 35 U.S.C. 154(b) by 248 days.

(21) Appl. No.: 18/243,515

(22) Filed: Sep. 7, 2023

(65) Prior Publication Data

US 2024/0010555 A1    Jan. 11, 2024

Related U.S. Application Data

(63) Continuation-in-part of application No. PCT/US2023/063476, filed on Mar. 1, 2023.

(Continued)

(51) Int. Cl.
*C04B 7/04*         (2006.01)
*C04B 14/02*        (2006.01)
(Continued)

(52) U.S. Cl.
CPC .............. *C04B 7/04* (2013.01); *C04B 14/022* (2013.01); *C04B 24/008* (2013.01); *C04B 2103/32* (2013.01)

(58) Field of Classification Search
CPC ....... C04B 7/04; C04B 14/022; C04B 24/008; C04B 2103/32
See application file for complete search history.

(56) References Cited

U.S. PATENT DOCUMENTS

| | | | |
|---|---|---|---|
| 11,919,809 B2 | 3/2024 | Cracian et al. | |
| 2014/0060388 A1* | 3/2014 | Sadiq ..................... | B82Y 30/00 |
| | | | 977/734 |

(Continued)

FOREIGN PATENT DOCUMENTS

| | | |
|---|---|---|
| CN | 108191340 A | 6/2018 |
| CN | 108862265 A | 11/2018 |
| CN | 112268933 A | 1/2021 |
| CN | 112341123 A | 2/2021 |
| CN | 113003995 A | 6/2021 |
| CN | 113979707 A | 1/2022 |

(Continued)

OTHER PUBLICATIONS

Ying, J. et al., "Synergistic effects of three-dimensional graphene and silica fume on mechanical and chloride diffusion properties of hardened cement paste", Construction and Building Materials, vol. 316, No. 125756; Dec. 6, 2021; 12 pages.

(Continued)

*Primary Examiner* — Crystal J Lee
(74) *Attorney, Agent, or Firm* — Paradice & Li LLP

(57)         ABSTRACT

Cement compositions including ordinary Portland cement, a secondary cementitious material (SCM) including one or more of pozzolan, metakaolin, limestone, or gypsum in an amount of up to approximately 70% of a replacement level of ordinary Portland cement, and between approximately 0.05% by weight of cement (bwoc) and 2% bwoc of aggregates of mesoporous carbon nanoparticles (3DG) carbons. The cement compositions regulate nucleation and time-lapsed growth of calcium silica hydrates during initial hydration. The 3DG carbons include aggregates of mesoporous carbon nanoparticles, which include one or more interconnected bundles of electrically conductive graphene layers. The 3DG carbons include oxygen containing func- (Continued)

tional groups disposed on one or more of the surfaces of the 3DG carbons or within the 3DG carbons.

21 Claims, 19 Drawing Sheets

Related U.S. Application Data

(60) Provisional application No. 63/447,984, filed on Feb. 24, 2023, provisional application No. 63/316,597, filed on Mar. 4, 2022.

(51) Int. Cl.
  *C04B 24/00* (2006.01)
  *C04B 103/32* (2006.01)

(56) References Cited

U.S. PATENT DOCUMENTS

| | | | |
|---|---|---|---|
| 2015/0152314 A1 | 6/2015 | Muthusamy et al. | |
| 2015/0240047 A1* | 8/2015 | Korzhenko | C04B 28/02 507/119 |
| 2019/0315654 A1 | 10/2019 | Balachandra | |
| 2021/0024414 A1* | 1/2021 | Boul | C04B 20/1033 |
| 2021/0347693 A1* | 11/2021 | Moya | C04B 14/026 |
| 2021/0355041 A1* | 11/2021 | Fulton | C04B 40/0046 |
| 2022/0242787 A1* | 8/2022 | Akono | C04B 28/04 |
| 2024/0010555 A1 | 1/2024 | Poelma et al. | |

FOREIGN PATENT DOCUMENTS

| | | |
|---|---|---|
| CN | 115231880 A | 10/2022 |
| KR | 101964367 B1 | 4/2019 |
| WO | 2018/148043 A1 | 8/2018 |
| WO | 2020/209975 A2 | 10/2020 |
| WO | 2023/168263 A1 | 9/2023 |

OTHER PUBLICATIONS

Ying, J. et al., "Microstructure, Mechanics, and Chloride Diffusion of Three-Dimensional Graphene Reinforced Cement Paste", J. Mater. Civ. Eng., vol. 35, No. 4; ASCE; Jan. 31, 2023; 15 pages.

International Search Report and Written Opinion dated Jul. 25, 2025 for PCT Appl. No. PCT/US2024/045741; 27 pages.

Liu, J. et al., "Study on dispersion, mechanical and microstructure properties of cement paste incorporating graphene sheets", Construction and Building Materials, vol. 199; Dec. 8, 2018; pp. 1-11.

Du, H. et al., "Improvement in concrete resistance against water and chloride ingress by adding graphene nanoplatelet", Cement and Concrete Research, Pergamon Press, Elmsford, NY, vol. 83, Mar. 2, 2016; pp. 114-123.

International Search Report and Written Opinion dated Jul. 3, 2023 for PCT Appl. No. PCT/US2023/063476; 17 pages.

Krishna, R.S. et al., "The role of graphene and its derivatives in modifying different phases of geopolymer composites: A review", Construction and Building Materials, Elsevier, Netherlands; vol. 306; Sep. 21, 2021; 21 pages.

Lin, J. et al., "Dispersion of graphene oxide-silica nanohybrids in alkaline environment for improving ordinary Portland cement composites", Cement and Concrete Composites, Elsevier Applied Science, Barking, GB; vol. 106; Dec. 12, 2019; 9 pages.

Ma, Y. et al., "Three-dimensional graphene networks: synthesis, properties and applications", National Science Review, vol. 2, No. 1; Dec. 17, 2014; pp. 40-53.

Mulyana, Y. et al., "Reversible Oxidation of Graphene Through Ultraviolet/Ozone Treatment and Its Nonthermal Reduction through Ultraviolet Irradiation", The Journal of Physical Chemistry C, vol. 118, No. 47; Nov. 26, 2014; pp. 27372-27381.

Wong, J. et al., "Cementitious, Pozzolanic and Filler Materials for DSM Binders", Civil Engineering Journal, vol. 6, No. 2; Mar. 27, 2020; pp. 402-417.

Ying, J. et al., "Microstructure and Chloride Diffusion Properties of Hardened Fly Ash Cement Paste with Three-dimensional Graphene", Intl. Journal of Concrete Structures and Materials, vol. 16, No. 1; Jan. 28, 2022; 13 pages.

Galpaya, D. et al., "Recent Advances in Fabrication and Characterization of Graphene-Polymer Nanocomposites", Graphene, vol. 1, No. 2, Oct. 2012; pp. 30-49.

First Examination Report, EP Serial No. 23713252.7 dated Nov. 26, 2025; 13 pages.

Wang, X. et al., "One pot facile transformation of CO2 to an unusual 3-D nano-scaffold morphology of carbon", Scientific Reports; vol. 10, No. 1; Dec. 9, 2020; 12 pages.

International Search Report and Written Opinion dated Mar. 6, 2026 for PCT Application No. PCT/US2025/054615; 12 pages.

\* cited by examiner

100B

201

202

500

501
Nano-silica
clusters

510

511
Nano-silica
clusters

600A
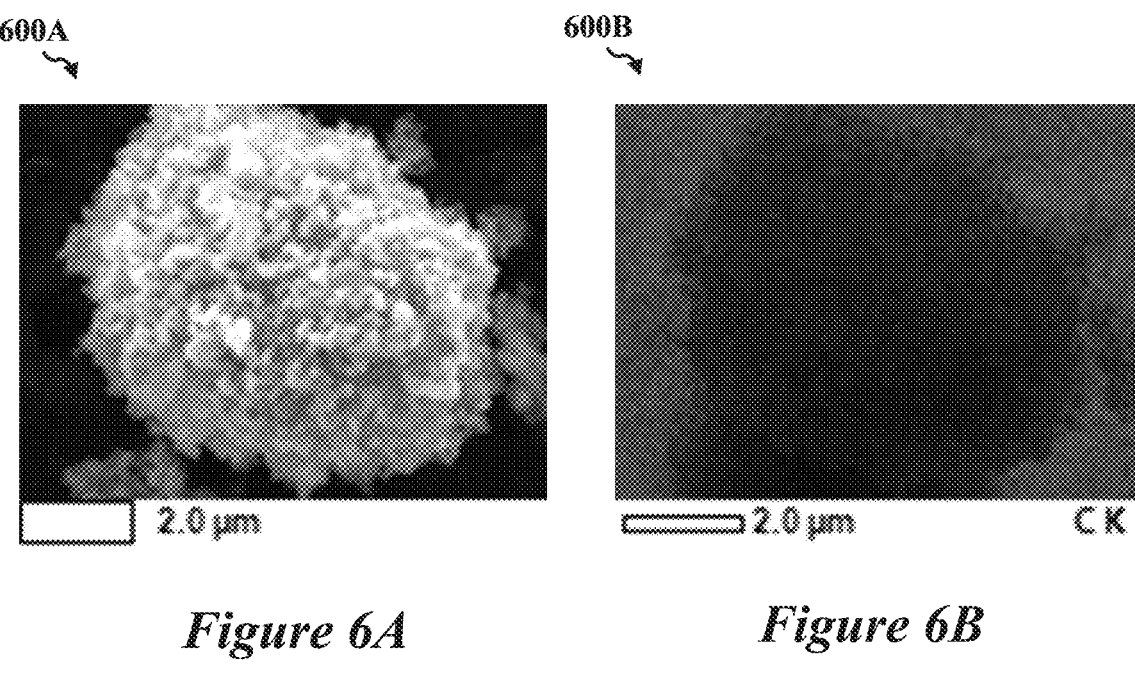
*Figure 6A*
*Figure 6B*
600C
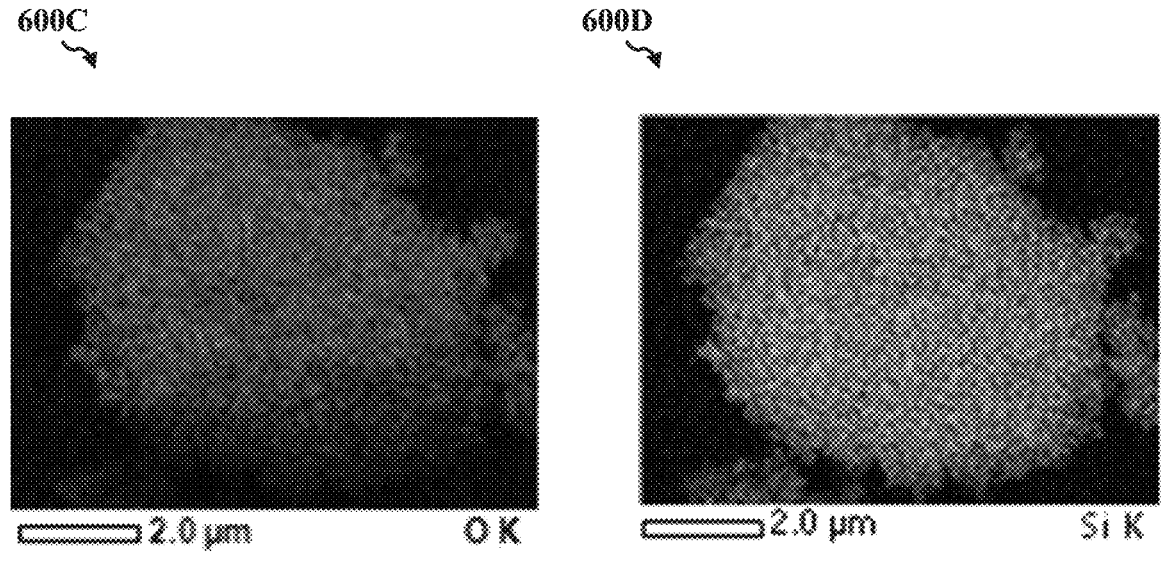
*Figure 6C*
*Figure 6D*

900B

900C

1500

CEMENT COMPOSITIONS WITH 3D GRAPHENE CARBONS

RELATED APPLICATIONS

This Patent Application is a continuation-in-part application claiming priority to International Patent Application No. PCT/US23/63476 entitled "CEMENT COMPOSITIONS WITH 3D GRAPHENE CARBONS" and filed on Mar. 1, 2023, which claims priority to U.S. Provisional Patent Application No. 63/316,597 entitled "USING 3D GRAPHENES TO REGULATE NUCLEATION AND TIME-LAPSED GROWTH DURING GELATION/FORMATION OF POLYMERIZED CHAINS IN CEMENTS" and filed on Mar. 4, 2022, and to U.S. Provisional Application No. 63/447,984 entitled "CEMENT COMPOSITIONS WITH 3D GRAPHENE CARBONS" and filed on Feb. 24, 2023, all of which are assigned to the assignee hereof. The disclosures of all prior Applications are considered part of and are incorporated by reference in this Patent Application in their respective entireties.

TECHNICAL FIELD

This disclosure relates generally to cement compositions, and, more particularly, to cement compositions that include aggregates of mesoporous carbon nanoparticles.

DESCRIPTION OF RELATED ART

Recent developments in cement compositions are focused on decreasing $CO_2$ emissions of processes used for making and using cement. However, further improvements in cement compositions are desired.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In some implementations, an example cement composition may include ordinary Portland cement, a secondary cementitious material ("SCM") including one or more of metakaolin, limestone, or gypsum in an amount corresponding to up to approximately 70% replacement level of ordinary Portland cement, a superplasticizer in a concentration range of between approximately 0.05% by weight of cement (bwoc) and approximately 2% bwoc, and aggregates of mesoporous carbon nanoparticles (referred to as 3DG carbons in this disclosure) in amounts of between approximately 0.05% bwoc and approximately 2% bwoc. In some aspects, the 3DG carbons may include oxygen containing functional groups disposed on one or more of the surfaces of the 3DG carbons or within the 3DG carbons.

In some implementations, the mesoporous carbon nanoparticles in the example cement compositions may include one or more interconnected bundles of electrically conductive graphene layers. In some other implementations, the graphene layers may be arranged as one or more stacks. In some aspects, the one or more stacks may be connected to each other to define a 3D porous scaffold structure including mesopores. In some other aspects, the one or more stacks may be connected such that they are disposed substantially orthogonal to each other. In some aspects, the graphene layers may be characterized by a linear dimension of between about 50 nm to about 200 nm. In some other aspects, the graphene layers may include one or more of single layer graphene (SLG), few layer graphene (FLG), or many layer graphene (MLG).

In some implementations, the 3DG carbons in the example cement compositions may be characterized by a Raman spectroscopy signature having an ID/IG ratio between approximately 0.95 and approximately 1.05. In some other implementations, the 3DG carbons may be characterized by a Brunauer-Emmett-Teller (BET) surface area measured using nitrogen gas of about 50 to 300 m2/g.

In some implementations, the 3DG carbons in the example cement compositions may be characterized by a graphene to amorphous carbon ratio of between about 1% and 95%. In some other implementations, the 3DG carbons may be characterized by an electrical conductivity of between about 500 S/m and about 20,000 S/m when compressed at pressure of about 12,000 pounds per square inch (psi).

In some implementations, the oxygen containing functional groups may include one or more of epoxide (C—O—C), hydroxyl (—OH), ether (C—O—C), ketone (O—C=O), or carboxylic acid (—COOH) groups. In some aspects, the oxygen concentration associated with the oxygen containing functional groups may be between about 1 wt % and about 25 wt %. In some other aspects, the oxygen concentration associated with the oxygen containing functional groups disposed on the surface of the 3DG carbons may be between about 4 at % and about 5 at %.

In some implementations, the SCM in the example cement compositions may include (on a bwoc basis) between about 20 wt % and about 35 wt % metakaolin, between about 15% and about 40 wt % limestone, and between about 0.5 wt % and about 3.5 wt % gypsum.

In some implementations, the superplasticizer in the example cement compositions may include one or more of polycarboxylate ether, sulfonated naphthalene formaldehyde condensate, sulfonated melamine formaldehyde condensate, or acetone formaldehyde condensate.

In some implementations, an example method of making a mortar including any one of the cement compositions previously described may include mixing a cement blend with water at a water to cement ratio by weight of between approximately 0.3 and approximately 0.5 to form a first mixture. An example cement blend may include ordinary Portland cement, a secondary cementitious material ("SCM") including one or more of metakaolin, limestone, or gypsum in an amount corresponding to up to approximately 70% replacement level of ordinary Portland cement, and a superplasticizer in a concentration range of between approximately 0.05% bwoc and approximately 2% bwoc. In some implementations, the SCM may include between about 20 wt % and about 35 wt % metakaolin, between about 15% and about 40 wt % limestone, and between about 0.5 wt % and about 3.5 wt % gypsum, on a bwoc basis.

In some implementations, the example method may continue with mixing a suspension of aggregates of mesoporous carbon nanoparticles (3DG carbons) in water into the first mixture. The 3DG carbons may include one of the carbon materials disclosed herein. The 3DG carbons may include oxygen containing functional groups disposed on one or more of the surfaces of the 3DG carbons or within the 3DG carbons. In some aspects, the amount of 3DG carbons in the example mortar may be between approximately 0.05% bwoc and approximately 2% bwoc.

In some implementations, the water absorption rate of the mortar measured using ASTM C1585 may be less than 1 mm at a square root time greater than 80 s½. The charge passed through value of the mortar measured using ASTM C1202 may be less than 200 coulombs after a curing period of 28 days. The non-steady state chloride migration coefficient of the mortar based on NT Build 492 tests may be less than $5 \times 10^{12}$ m²/s after a curing period of 28 days.

In some implementations, an example cement composition may include ordinary Portland cement, a secondary cementitious material ("SCM") including pozzolan, in an amount corresponding to up to approximately 70% replacement level of ordinary Portland cement, and aggregates of carbon nanoparticles having graphene nanoplatelets such as 3-dimensional graphene ("3DG carbons"). The amount of 3DG carbons may be between about 0.05% bwoc and 2% bwoc. The pozzolan may include between approximately 50 wt % and approximately 70 wt % $SiO_2$, between approximately 10 wt % and 20 wt % $Al_2O_3$, and less than approximately 10 wt % each of $Fe_2O_3$ and MgO. The loss on ignition (LOI) of the pozzolan may be less that approximately 10 wt %. The 3DG carbons may be characterized by a Raman spectroscopy signature having an $I_D/I_G$ ratio between approximately 0.95 and approximately 1.05.

In some implementation, an example cement composition may include ordinary Portland cement, a SCM including one or more of metakaolin, slag, fly ash, pyroclastic ash, or limestone, in an amount corresponding to up to approximately 70% replacement level of ordinary Portland cement, and 3DG carbons. The amount of 3DG carbons may be between approximately 0.05% bwoc and approximately 2% bwoc. The amount of 3DG carbons may be between approximately 0.05% bwoc and approximately 1% bwoc. The 3DG carbons may be surface functionalized with one or more of silicate compounds or nano-silica. The SCM may include between approximately 50 wt % and approximately 70 wt % $SiO_2$, between approximately 10 wt % and approximately 20 wt % $Al_2O_3$, and less than approximately 10 wt % each of $Fe_2O_3$ and MgO. The loss on ignition (LOI) of the SCM may be less that approximately 10 wt %. The 3DG carbons may be characterized by a Raman spectroscopy signature having an $I_D/I_G$ ratio between approximately 0.95 and approximately 1.05. The 3DG carbons may be surface functionalized with one or more of silicon, sulfur, oxygen, nitrogen, silicon, lithium, sodium or potassium. The 3DG carbons surface functionalized with nano-silica may include between approximately 20 at. wt % and approximately 65 at. wt % Si, and between approximately 15 at. wt % and approximately 40 at. wt % O. The O/Si ratio of the 3DG carbons surface functionalized with nano-silica may be between approximately 1.5 and approximately 3.

In some implementations, an example cement composition may include ordinary Portland cement, a SCM including one or more of metakaolin, limestone, or gypsum, in an amount corresponding to up to approximately 70% replacement level of ordinary Portland cement, a superplasticizer in a concentration range of between approximately 0.05% by weight of cement ("bwoc") and approximately 2% bwoc, and 3DG carbons. The amount of 3DG carbons may be between about 0.05% bwoc and 2% bwoc. The amount of 3DG carbons may be between about 0.05% bwoc and 1% bwoc. The amount of gypsum may be between about 0.5 wt % and approximately 3.5 wt %. The superplasticizer may include a polycarboxylate ether, for example, Arkema's Ethacryl product or BASF's Liquiment product. The superplasticizer may be added to the cement paste during hydration as a dispersant. The example cement composition may further include rheology modifiers, that include, but are not limited to, hydroxyethylcellulose in a concentration range of between approximately 0.05% bwoc and approximately 1.0% bwoc. The 3DG carbons may be surface functionalized with one or more of silicate compounds or nano-silica. The SCM may include approximately 65 wt % metakaolin (or generally pozzolan), approximately 32 wt % limestone, and approximately 3 wt % gypsum. The SCM may include approximately 97 wt % of one or more of metakaolin or limestone, and approximately 3 wt % gypsum.

In some implementations, an example cement composition may include ordinary Portland cement, a secondary cementitious material (SCM) including one or more of pyroclastic ash, slag, fly ash, metakaolin, or limestone in an amount corresponding to at least approximately 70% replacement level of ordinary Portland cement, and 3DG carbons. The amount of 3DG carbons may be between approximately 0.05% bwoc and approximately 2% bwoc. The amount of 3DG carbons may be between approximately 0.05% bwoc and approximately 1% bwoc. The 3DG carbons may include aggregates of carbon nanoparticles including graphene. The carbon nanoparticles may be characterized by a plurality of porous concentric shells including graphene, where each shell may enclose a porous carbon region. An interconnected porous network may be disposed in each carbon region and in fluid communication with contiguous carbon regions. The SCM may include between approximately 50 wt % and approximately 70 wt % $SiO_2$, between approximately 10 wt % and 20 wt % $Al_2O_3$, and less than approximately 10 wt % each of $Fe_2O_3$ and MgO. The loss on ignition (LOI) of the pozzolan may be less than approximately 10 wt %. The 3DG carbons may be characterized by a Raman spectroscopy signature having an $I_D/I_G$ ratio between about 0.95 and about 1.05. The size of the carbon nanoparticles may be between about 20 nm and about 750 nm. The size of the aggregates of carbon nanoparticles may be between about 50 nm and about 1500 nm. The size of the aggregates of carbon nanoparticles may be greater than about 2 μm. The 3DG carbons may surface etched using $CO_2$ etching. The 3DG carbons may be surface oxidized or functionalized with ozone. The 3DG carbons may be surface functionalized with one or more of silicate compounds or nano-silica. The 3DG carbons surface functionalized with one or more of silicate compounds or nano-silica may include between approximately 20 at. wt % and approximately 65 at. wt % Si, and between approximately 15 at. wt % and approximately 40 at. wt % 0. The O/Si ratio in the surface functionalized 3DG carbons may be between approximately 1.5 and approximately 3. The 3DG carbons may be surface functionalized with one or more of oxygen, nitrogen, silicon, sodium or potassium.

In some implementations, an example method for regulating calcium-silicate-hydrate ("CSH") nucleation and time-lapsed growth during the initial hydration of cement comprising may include providing one or more of the cement compositions as described in this disclosure that include 3DG carbons and mixing with water, where the water to cement ratio by weight may be approximately between about 0.3 and approximately 0.5.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6A shows a SEM/EDS micrograph of 3DG carbons prior to functionalization, according to some implementations.

FIGS. 6B-6D show elemental composition maps measured during SEM/EDS analysis of 3DG carbons after nano-silica functionalization, according to some implementations.

Like reference numbers and designations in the various drawings indicate like elements.

DETAILED DESCRIPTION

Figure 1A:
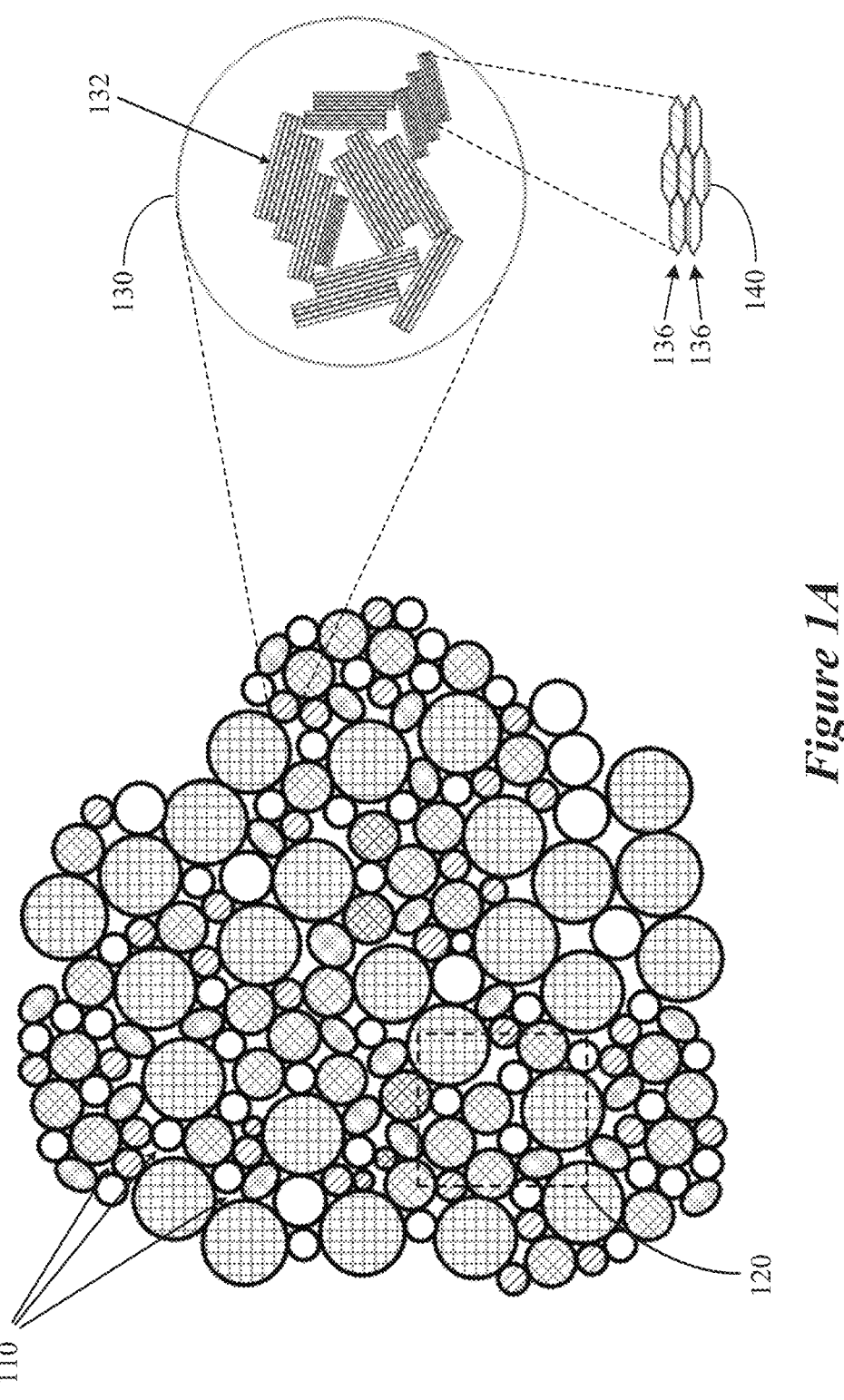
FIG. 1A shows a diagram of a mesoporous nanoparticle having an interconnected bundle of electrically conductive graphene sheets arranged to form a 3-dimensional (3D) porous scaffold structure, according to some implementations.

The following description is directed to some example implementations for the purpose of describing the innovative aspects of this disclosure. However, a person having ordinary skill in the art will readily recognize that the teachings herein can be applied in a multitude of different ways. The described implementations can be implemented in cement compositions for a variety of applications and may be tailored to compensate for various performance related deficiencies. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

Various aspects of the novel compositions and methods are described more fully herein with reference to the accompanying drawings. These aspects are provided so that this disclosure will be thorough and complete, and will fully convey the scope of the disclosure to those skilled in the art. Although some examples and aspects are described herein, many variations and permutations of these examples fall within the scope of the disclosure. Although some benefits and advantages of the various aspects are mentioned, the scope of the disclosure is not intended to be limited to benefits, uses, or objectives. The detailed description and drawings are merely illustrative of the disclosure rather than limiting, the scope of the disclosure being defined by the appended claims and equivalents thereof.

Ordinary Portland cement ("OPC") is produced by calcining limestone ($CaCO_3$) with clay (aluminosilicates) in a kiln at about 1500° C. to form a sintered product commonly known as clinker. Portland cement is used as a cementitious material (binder) in cement products such as concrete. ASTM standard specification (ASTM C150) requires that Portland cement "must have the following chemical compositions: aluminum oxide, ferric oxide, magnesium oxide, sulfur trioxide, tricalcium silicate ("C3S"), dicalcium silicate ("C2S"), tricalcium aluminate ("C3A"), and tetracalcium aluminoferrite." When mixed with water, the calcium silicates and aluminates are hydrated via several hydration and gelation reactions to primarily form calcium-silicate-hydrate ("CSH") paste, which gradually bonds sand and gravel particles in concrete together and hardens to form a solid water-resistant product via a process known as setting. After initial setting, concrete continues to harden and develop its mechanical strength over a period of about 30 days. About less than 5 wt % gypsum (hydrated calcium sulfate) may be added to clinker and ground to fine powder in a ball mill. Gypsum is added primarily to retard the setting time of cement by slowing down the hydration rates of the C2S, C3S and C3A, and more importantly, the exothermic hydration of C3A by preventing "flash setting."

In addition to forming CSH, hydration typically forms a byproduct known as Portlandite, which is composed of calcium hydroxide ("CH"). Portlandite does not have cementitious properties and may cause an undesirable increase in the permeability of concrete to water, which reduces the mechanical strength of concrete. To mitigate this effect, supplementary cementitious materials ("SCM") commonly known as pozzolans may be added to Portland cement or concrete prior to hydration, to react with CH and water during hydration via the pozzolanic reaction, which also has the beneficial effect of forming additional CSH cementitious compounds.

An SCM may be defined as "an inorganic material that contributes to the properties of a cementitious mixture through hydraulic or pozzolanic activity, or both." See, for example, ASTM 2015, Paper FHWA-HIF-16-001, U.S. Department of Transportation. The type and amount of SCMs may be varied to reduce the amount of Portland cement in concrete (or increase the replacement levels of cement), without sacrificing mechanical strength. SCMs may contribute to the formation of cementitious materials by both hydraulic activity and pozzolanic activity. SCMs (and cements) that have hydraulic properties, harden during hydration, and that hardening process does not require drying. SCMs with pozzolanic activity require both water and CH as reactants to form CSH.

As previously described, undesirable CH produced by hydraulic activity (for example, hydration of Portland cement), may be consumed during pozzolanic activity provided by SCMs to produce additional amounts of cementitious compounds like CSH. Examples of SCMs may include fly ash (byproduct of coal fired furnaces), blast furnace slag, silica fume, and natural pozzolans like metakaolin. Other SCMs such as slag may exhibit hydraulic activity and produce cementitious compounds during hydration. Slag cement does not exhibit pozzolanic activity but consumes CH by binding alkalis in its hydration products. Therefore, although it is a hydraulic cement, slag cement provides the benefits of a pozzolan. SCMs are also used to improve concrete performance in its fresh and hardened state and also to improve the workability, durability and strength of concrete.

The amount of fly ash in concrete may vary from 5% to 65% by mass of the cementitious materials. The amount of slag may vary from 20% to 70% by mass of the cementitious materials. The amount of silica fume may vary from 5% to 12% by mass of cementitious materials. Natural pozzolans that exhibit pozzolanic activity may include metakaolin, calcined shale, or clay. The amount of metakaolin may vary from 5% to 70% by mass of cementitious materials. Higher amounts (percentage by mass) of calcined shale or clay may be used. See, for example, paper CIP30-SCMs, National Ready Mixed Concrete Association, 2000. While fly ash and slag increase initial set time and setting time of concrete, silica fume accelerates the hydration of Portland cement by providing nucleation sites for the formation of hydration products like CSH.

The cement industry contributes to about 8% of global greenhouse gas ($CO_2$) emissions. About 90% of these emissions are produced during the high temperature calcination process of limestone and clay materials at amounts of about 0.8 tons $CO_2$ per ton of OPC, which includes the amount of $CO_2$ produced by combustion of fuels used to heat the kilns. Accounting for $CO_2$ emissions from quarry-to-point-of-use, approximately 1 ton of $CO_2$ is produced per ton of OPC. Therefore, considerable research and development has been directed to reduce the amount of Portland cement in concrete and increase the replacement levels of cement. As described above, using SCM additives is one approach to increase the replacement levels of cement and realize reductions in $CO_2$ emissions.

Researchers at Exeter University (United Kingdom) have reported that graphene additives to cement may increase the replacement level of cement in concrete by as much as 50% and lead to significant reduction in $CO_2$ emissions. Small amounts of graphene additives also increase the mechanical strength, durability, and the water resistance of concrete. Graphene is a single layer of carbon atoms arranged in a hexagonal structure. Atomically thin shards of graphene may be suspended in water during mixing concrete. Additionally, researchers at the University of Manchester (United Kingdom) have reported that graphene not only provides mechanical strength, but also acts as a catalyst surface for initiating hydration reactions, which provides a finished cement product with improved strength, durability, and corrosion resistance.

PureGraph® (First Graphene, United Kingdom) is a graphene nanoplatelet powder additives with particle size ($D_v50$) from 5 μm to 50 μm. The graphene nanoplatelets are produced by electrochemical exfoliation of graphite. The powders are not aggregated and may be dispersed in water and added to cement. Reports suggest that 0.01% to 0.05% of graphene nanoplatelet powders in cement compositions provide the same or better mechanical strength as Portland cement in cementitious products while reducing the amount of clinker, required by about 20% to 30%. That is, the replacement level of OPC is about 20% to 30%. As such, $CO_2$ emission reduction of about 20% is possible even with small amounts of graphene additives.

Reports suggest that graphene physically and chemically interacts with cementitious binders and improves adhesion between the graphene basal planes and cement gel by Van der Waals forces, which reinforces the hydrated structure by preventing cracks from developing at a nanoscale. Changes in porosity and hydration at the graphene-cement interface have also been observed. When used as a water-based admixture in typical cement-based mortar at dosing levels of less than 0.1%, graphene was found to increase compression strength by 34% increase in and tensile strength by 7%. However, graphene produced by exfoliation of graphite is an expensive boutique additive. Reports suggest that in volumes approaching about 5 tons, the price range of the graphene nanoplatelet powders may be about $250/kg-$300/kg, which is about 2000× the U.S. price of Portland cement (of about $125/ton). Less expensive additives and cement compositions which offer higher replacement levels of Portland cement, and which lead to reduced setting time without reduction in mechanical strength are required.

In some implementations, an example cement composition may include ordinary Portland cement ("OPC"), one or more SCM additives, and 3DG carbons as additives or fillers. Any one of the SCMs or combination of SCMs previously described in this disclosure may be used to form cement compositions in accordance with aspects of the present disclosure. The amount of 3DG carbons may be between approximately 0.05% by weight of cement (bwoc) and 2% bwoc. The 3DG carbons may include aggregates of carbon nanoparticles having graphene nanoplatelets with an interconnected porous network. The 3DG carbons may include graphene nanoplatelets orthogonally joined to each other to form a 3D porous graphene scaffold structure. The graphene nanoplatelets may include one or more of single layer graphene ("SLG"), few layer graphene (FLG), or many layer graphene ("MLG").

FIG. 1A shows a diagram of a mesoporous carbon nanoparticle 100A having an interconnected bundle of electrically conductive graphene sheets arranged to form a 3D open porous scaffold structure, according to some implementations. Nanoparticle 100A and aggregates of nanoparticles 100A (as described below) may be produced by high throughput, low-cost, cracking of a hydrocarbon gas (such as natural gas) in an atmospheric microwave plasma reactor. An example microwave plasma reactor that can be used to produce the aggregates of nanoparticles 100A is disclosed in commonly-owned U.S. Pat. No. 9,767,992, which is incorporated by reference herein in its entirety. For example, carbon nanoparticles 100A may be formed in-flight and grown by adding additional carbon-based materials derived from incoming carbon-containing gas within a microwave-plasma reaction chamber.

A plurality of primary carbon nanoparticles 100A produced by one or more methods including thermal cracking of a hydrocarbon gas or source material may be coalesced or joined to form aggregates of primary particles. An aggregate may be considered to be a discrete, colloidal entity that is the smallest dispersible unit composed of coalesced primary carbon nanoparticles. A primary carbon particle may be considered to be a spheroidal shaped, non-discreet component of an aggregate that is separable from the aggregate only by fracturing. The primary carbon particles may be connected together by one or more of Van der Waals forces, covalent bonds, ionic bonds, metallic bonds, or by other physical or chemical interactions. Additionally, a plurality of aggregates may be considered to be agglomerates. Since aggregates of at least 1 µm in size may be considered to be agglomerates, the term "aggregates" also includes "agglomerates" in this disclosure. A carbon nanoparticles aggregate may be characterized by a principal dimension (diameter, length, width) of greater than about 1 µm.

The carbon nanoparticles 100A may be or may include three-dimensional ("3D") multi-modal mesoporous carbon nanoparticles. A mesoporous material, as generally understood and as referred to herein, includes a material containing pores with diameters between 2 nm and 50 nm, according to IUPAC nomenclature. For the purposes of comparison, IUPAC defines microporous material as a material having pores smaller than 2 nm in diameter and defines macroporous material as a material having pores larger than 50 nm in diameter. In some instances, mesoporous carbon particle 100A may be characterized by a three-dimensional ("3D") hierarchical porous structure including pores 110. In some aspects, at least a portion of the hierarchical porous structure may further define a 3D open porous scaffold structure 120.

The nanoparticle 100A may include one or more interconnected bundles 130 of electrically conductive graphene platelets or sheets. Each interconnected bundle 130 may include one or more stacks 132 of graphene sheets. Each stack 132 may include a plurality of graphene layers 136 that are generally stacked horizontally as more clearly shown in stack 140. One or more stacks 132 of graphene sheets 136 may be arranged to form a 3D porous scaffold structure 120. That is, a plurality of stacks 132 of electrically conductive graphene layers 136 may be sintered together to define the 3D open porous scaffold structure 120 (which includes mesopores 110 in the example of FIG. 1A). In some implementations, one or more of the stacks 132 may be connected substantially orthogonal to each other. The open porous scaffold structure 120 may be configured to provide electrical conduction between contact points (not shown for simplicity) of the stacks of graphene sheets 136. In some implementations, each graphene layer 136 may be characterized by a diameter or linear dimension ("La") of between about 50 nm to about 200 nm. The graphene stack 132 may include few layer graphene ("FLG"), which may be composed of 5 to 15 layers of graphene.

A plurality of primary carbon nanoparticles 100A may be coalesced or joined to form aggregates of primary particles. In this disclosure, three-dimensional graphene carbons ("3DG carbons") include aggregates or agglomerates of mesoporous nanoparticles 100A. In some implementations, the example 3DG carbons described herein may be characterized by a Brunauer-Emmett-Teller ("BET") surface area measured using nitrogen gas of about 50 to 300 m$^2$/g. In some implementations, the 3DG carbons may be characterized by a graphene to amorphous carbon ratio of between about 1% and 95%. In some implementations, the 3DG carbons may be characterized by a carbon purity of at least 99.9%. The 3DG carbons may be characterized by an electrical conductivity of between about 500 S/m and about 20,000 S/m when compressed at pressure of about 12,000 pounds per square inch ("psi"). Without being bound by any particular theory, the 3DG carbons including mesoporous nanoparticles as described herein may improve the mechanical strength of a cementitious product.

In some implementations, dopants such as sulfates, silicates and alkalis that beneficially impact cement hydration processes may be disposed on the surface of 3DG carbons including mesoporous nanoparticles 100A, may be micro-confined in the pores of the open porous scaffold structure 120, or may be nano-confined in the open porous scaffold structure 120.

Figure 1B:
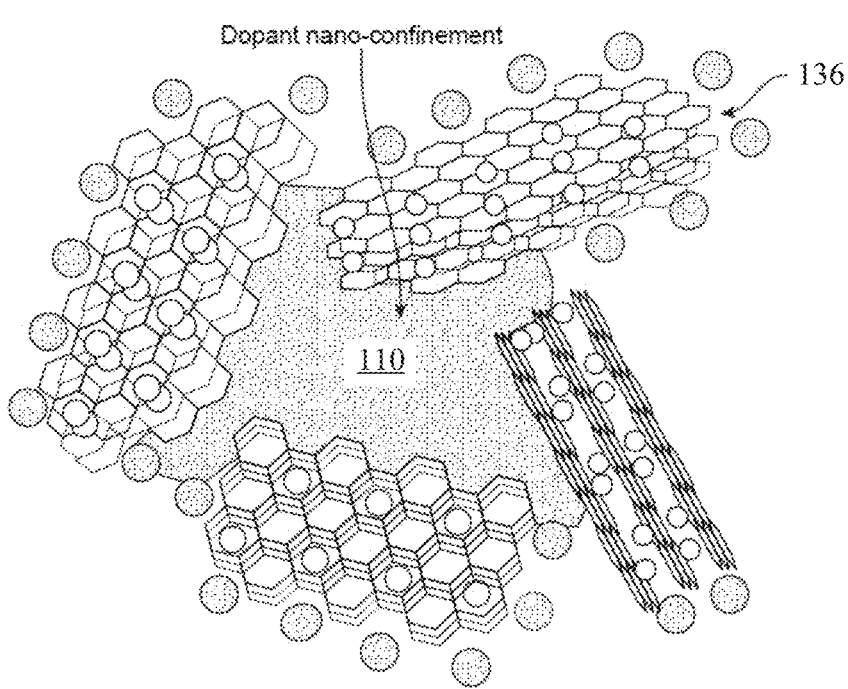
FIG. 1B shows a diagram of nano-confinement of a dopant in the space between orthogonally joined graphene platelets of FIG. 1A, according to some implementations.

FIG. 1B shows a diagram 100B of nano-confinement of a dopant in the pores 110 disposed between orthogonally joined graphene layers 136, according to some implementations. In some instances, the dopants may be nano-confined in the 3D open porous scaffold structure 120 and released out as a function of time. Timed-release of nucleating agents may be tuned to impact the acceleration of the pozzolan reaction after the formation of Portlandite from the reaction of anhydrous calcium silicate with water. 3DG carbons including mesoporous nanoparticles 100A may also provide a flexible scaffold-type structure to manage material expansion and mitigate crack formation during hydration and curing of cement. In some configurations, the stack 132 may include one or more of single layer graphene ("SLG"), few layer graphene ("FLG") defined as ranging from 5 to 15 layers of graphene, or many layer graphene ("MLG").

In some implementations, mesoporous nanoparticles 100A may include a plurality of interconnected crinkled 3D graphene sheets, a plurality of non-hollow carbonaceous spherical particles ("NHCS"), flat graphene, wrinkled graphene, a plurality of carbon nanotubes ("CNTs"), or a plurality of carbon nano-onions ("CNOs"). In some implementations, mesoporous nanoparticles 100A may include wavy or flexible graphene layers that resemble crinkled paper and may be produced using microwave processes. The graphene layers may be flexible as they may be fused with each other at sp$^3$ type defects in the sp$^2$ graphene lattice structure.

Figure 2A:
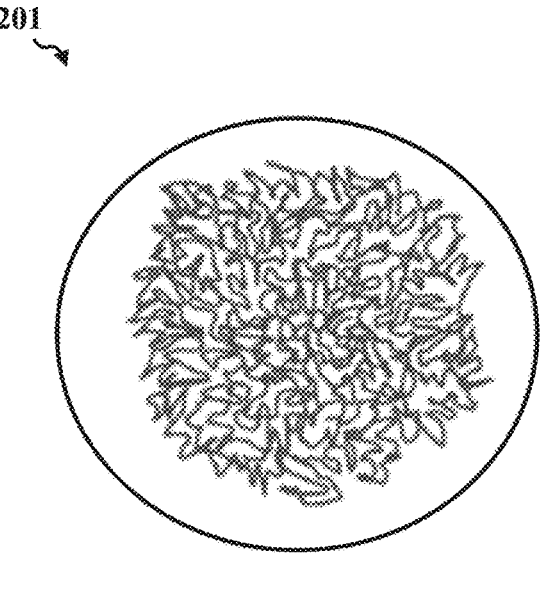
FIG. 2A shows another diagram of example 3-dimensional graphene (3DG) carbons, according to some implementations.
Figure 2B:
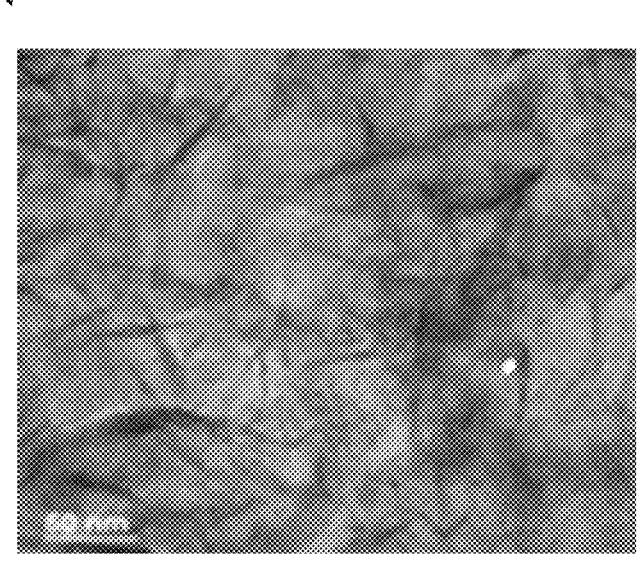
FIG. 2B shows a transmission electron microscope (TEM) micrograph of 3DG carbons, according to some implementations.

FIG. 2A shows a diagram of 3DG carbons 201 having porous interconnected graphene nanoplatelets ("GNP") and a scaffolded structure, according to some implementations. FIG. 2B shows a TEM micrograph 202 of the 3DG carbons 201, according to some implementations. As shown, the 3D few-layer graphene ("FLG") structure is an aggregate at a 50 nm scale. Those skilled in the art will appreciate that the micrographs are shown by way of example only, and that other scales may exist without departing from the scope and spirit of the present implementations.

Figure 2C:
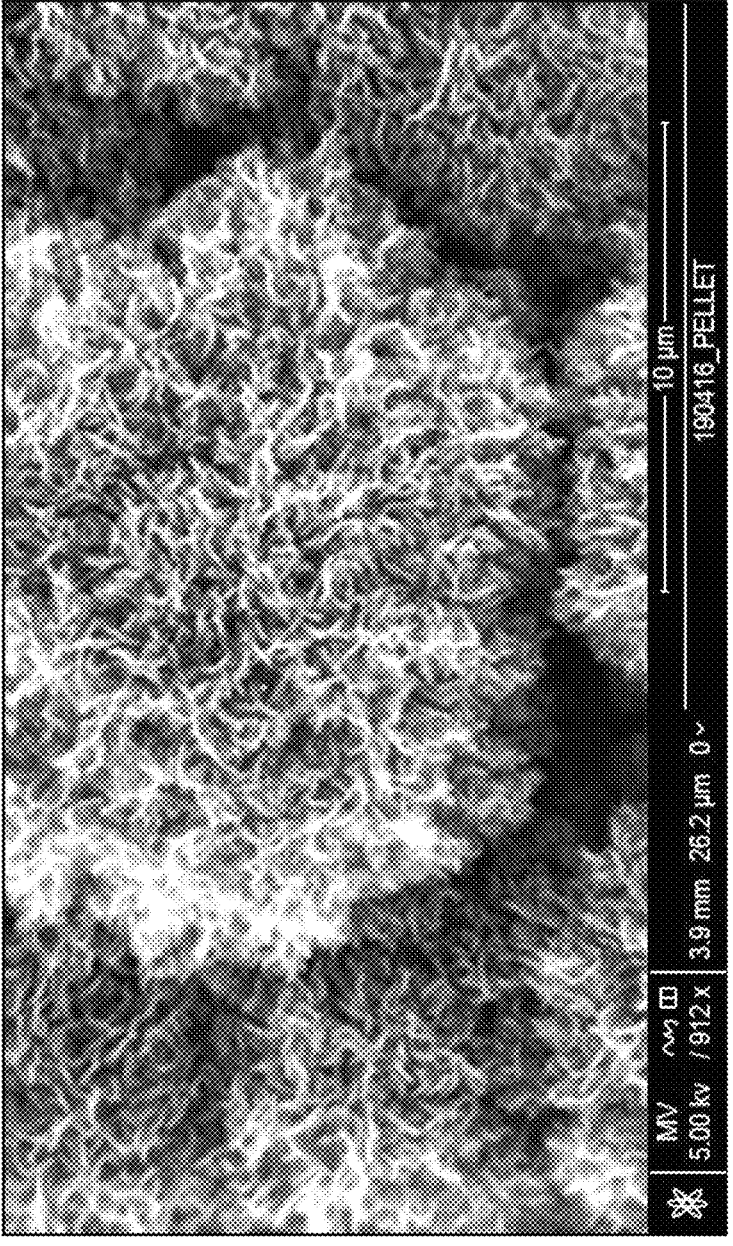
FIG. 2C shows a scanning electron microscope (SEM) micrograph of 3DG carbons, according to some implementations.

FIG. 2C shows a SEM micrograph of 3DG carbons 203, according to other implementations. In some instances, plasma-based processing conditions applied or performed in a reactor such as a microwave reactor may be adjusted with a high degree of tunability to achieve 3DG carbons and graphene-on-graphene densification to yield the complex 3D carbons 203. The 3DG carbons 203 may be surface etched using methods such as $CO_2$ etching to create pores on the external surface of the aggregates and to increase the surface area of the aggregates.

The 3DG carbons described herein and characterized using Raman spectroscopy show a high degree of order and uniformity of structure. In this disclosure, "graphene" refers to an allotrope of carbon in the form of a two-dimensional, atomic-scale, hexagonal lattice in which one atom forms each vertex. The carbon atoms in graphene may be $sp^2$ hybridized carbon atoms. Additionally, graphene has a Raman spectrum with two main peaks: a G-mode at approximately 1580 $cm^{-1}$ and a D mode at approximately 1350 cm-1 (when using a 532 nm excitation laser). The 3DG carbons may be characterized by a Raman spectroscopy signature having an $I_D/I_G$ ratio between approximately 0.95 and approximately 1.05.

Figure 3:
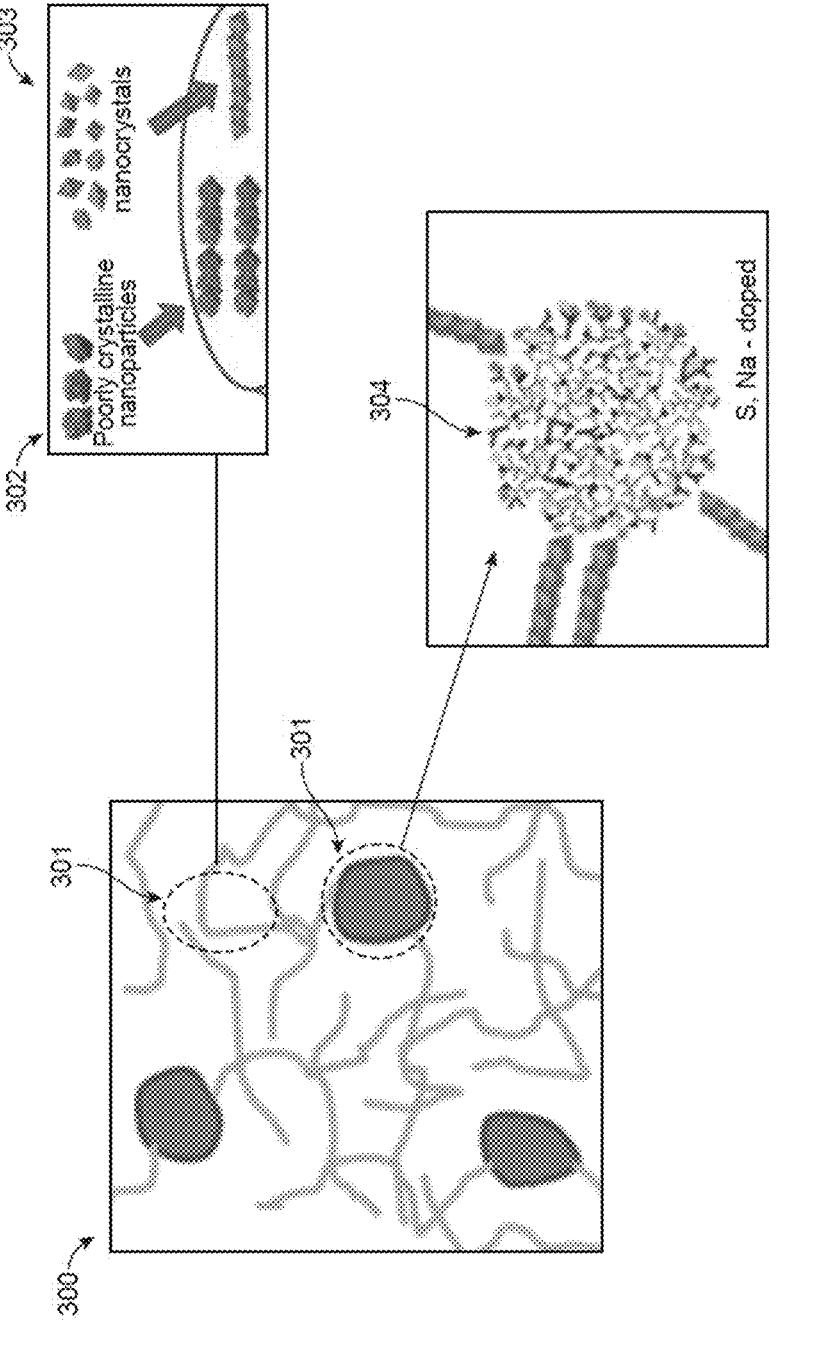
FIG. 3 shows a diagram of calcium-aluminosilicate hydrates including polymerized fibrous materials supported by 3DG carbons, according to some implementations.

FIG. 3 shows a diagram of calcium-aluminosilicate hydrates 300 including polymerized fibrous materials 301 supported by 3DG carbons 304, according to some implementations. Without being bound by any particular theory, hydration of ordinary Portland cement ("OPC") including gypsum (calcium sulfate dihydrate) may form random needle-like ettringite (calcium sulfo-aluminate), tobermorite (calcium silicate hydrate) and calcium-aluminosilicate hydrates ("CASH") in the form of entangled and branched polymerized fibrous material 301 of silicates and aluminates. Polymerized fibrous material 301 may include polymerized amorphous alumino-silicates 302 and crystalline alumino-silicates 303. 3DG carbons 304 may be used as fillers or seeding agents to anchor or serve as a "bridging agent" between polymerized CASH fibers, thereby leading to in higher compressive and tensile strength and greater resistance to fracture during the setting of the hydrated cementitious product. The high surface area of 3DG carbons 304 may provide a high density of nucleating sites for CSH or CASH, which may then grow and polymerize to form fibrous material 301.

By kinetically controlling the hydration and authigenic formation of entangled, needle-like crystalline phases in the cementitious matrix, elasticity and toughness may be improved over conventional concrete. 3DG carbons 304 used in example cement compositions may further reduce the permeability of the hydrated cementitious product over and above the reduction in permeability possible with the use of only a pozzolan as SCM. 3DG carbons 304 when used as additives or fillers may also reduce shrinkage on cooling the cementitious product because 3DG carbons exhibit negative thermal expansion. That is, the 3DG carbons 304 increase in size when cooling and decrease in size when heating. In contrast, cementitious products without any 3DG carbons 304 are characterized by positive thermal expansion. Therefore, by varying the amount of 3DG carbons 304 used as fillers or additives, crack formation in the cementitious product due to repetitive ambient temperature thermal cycling may be reduced.

In some implementations, an example cement composition may include ordinary OPC, volcanic or pyroclastic (pozzolana) ash or metakaolin as a SCM at about 70% replacement level of OPC, and 3DG carbons. That is, about 70% of OPC by mass may be replaced by pyroclastic (pozzolana) ash. The replacement level of OPC with metakaolin may be greater than 70%. In this example cement composition, metakaolin having varying amounts of aluminosilicates may be considered to be an SCM with pozzolanic activity. OPC exhibits high autogenous temperature rise and corresponding high tensile shrinkage strains during the exothermic hydration process. In contrast, metakaolin including aluminosilicates, hydrate or gelate at lower temperatures and lower rates thereby reducing mechanical strains and micro-cracking and producing a more elastic and toughened cementitious product with higher chemical resistance, lower permeability to water and other chemicals. Without being bound by any particular theory, the 3DG carbons and functionalized 3DG carbons serve as nucleating agents for CSH and CASH formation, which helps to realize the 70% replacement of OPC in the example Portland cement/SCM blends as disclosed herein. Table 1 summarizes the anticipated benefits of cement compositions with 3DG carbons as fillers or additives.

TABLE 1

Summary of benefits of cement composition including 3DG carbons.

| Material Property enhancement | Example mechanism |
|---|---|
| Improved tensile strength | 3DG carbons may form nucleation sites for forming cement calcium silicate hydrate (CSH) gels during hydration which subsequently controls grain size and degree of crystallinity of the cementitious product such as concrete. The beneficial effect of 3DG carbons may be modulated by morphology, surface area and surface chemistry (e.g., functionalization) of 3DG carbons. 3DG carbon morphology, surface area and surface chemistry may be tuned. |
| 3DG carbons may augment rebar or act as a substitute for rebar for mechanical reinforcement | Utilize the high tensile strength of 3DG carbons to improve the mechanical strength of the cementitious product. An electric field may be applied to the concrete mixture to align graphene particles in 3DG carbons to mimic rebar. Unlike rebar, the 3DG carbons may be more uniformly distributed throughout the thickness of the cementitious product. Reduced amounts of rebar may be required with cements including 3DG carbons. |

TABLE 1-continued

Summary of benefits of cement composition including 3DG carbons.

| Material Property enhancement | Example mechanism |
| --- | --- |
| Crack mitigation | 3DG carbons may act as "roadblocks" to the propagation of micro-cracks, thus reducing or mitigating crack growth, and in particular, during ambient temperature thermal cycling. |
| Permeability reduction to $O_2$, $H_2O$, $Cl_2$, acids, which may enhance durability of concrete | 3DG carbons interact with OPC, reducing grain size during hydration/curing, which may result in a dense matrix of cement grains. Porosity of the cementitious may be reduced. The conversion of Portlandite into hydrate cementitious material serves to reduce porosity in 3DG cements. The cementitious product may be more impervious to ambient air, water, chlorine, acids and sulfates commonly found in construction sites. The tortuous porous network in 3DG carbons may localize possible penetration of chemicals. |
| Crack healing (autogenous self-healing) | Crack healing may be realized via self-assembly of graphene at a crack location. Graphene may be chemically modified to have two separate surfaces: a hydrophobic and a hydrophilic surface. |

Figure 4:
FIG. 4 shows a box plot representation of compositions of pyroclastic ash secondary cementitious material (SCM) with known pozzolanic activity.

FIG. 4 shows a box plot representation 400 of compositions of pyroclastic ash SCM with known pozzolanic activity. Pyroclastic ashes or pumices materials result from explosive eruptions and show higher pozzolanic activity. The eruption type largely depends on the magma viscosity which is related to the "acidity" (i.e., $SiO_2$ content) of the magma. In general, more siliceous magma produces more explosive volcanism and products with better pozzolanic properties. Coarser highly vesicular pyroclastic material forms pumice-type deposits. Finely divided materials are transported further away from the volcanic source and are deposited as ash layers. Silica ($SiO_2$) content in most natural pumices and ashes fall in the intermediate range (approximately 50-70 wt % $SiO_2$) to acidic range (greater than approximately 70 wt % $SiO_2$). The pyroclastic ash may include between approximately 50 wt % and approximately 70 wt % $SiO_2$, between approximately 10 wt % and 20 wt % $Al_2O_3$, and less than approximately 10 wt % each of $Fe_2O_3$ and MgO. The loss on ignition ("LOI") of the pyroclastic ash may be less that approximately 10 wt %.

The total alkali content may vary depending upon the regional type of volcanic activity and may reach at least approximately 11 wt % on an anhydrous basis in Neapolitan pozzolans. Pyroclastic ashes may contain $Fe_2O_3$, CaO, and MgO in minor proportions. Loss on ignition ("LOI") may exceed approximately 10 wt % in some ashes. See, for example, Snellings et al., "Supplementary Cementitious Materials," Reviews in Mineralogy and Geochemistry, May 2012, which is incorporated herein in its entirety.

As previously described, the addition of gypsum to OPC prevents flash setting during hydration; however, gypsum retards the setting of the cementitious product. 3DG carbons may be functionalized using various methods to include specific dopants. 3DG carbons may include sulfur or sulfates anchored on the surface as shown in the example of FIG. 3 or may be micro-confined within the interconnected open porous scaffold structure 120 (as shown in FIG. 1A) or nano-confined in the scaffold structure formed by orthogonally joined graphene nanoplatelets (as shown in FIG. 1B). Sulfur compounds may be released in a controlled manner, that is, time released, into the CSH or CASH matrix during hydration facilitated by the tortuous interconnected porous network of the 3DG carbons. Sulfur-doped 3DG carbons enable regulated, local and distributed introduction of sulfate during the hydration process, which in turn enables control of the hydration rate and mitigates fast hydration, or flash set which adds stiffness. Controlling the hydration rate of cement can enhance elasticity and toughness without compromising the strength of the cementitious product.

Similarly, release of alkalis such as sodium or potassium from alkali-doped 3DG carbons may facilitate the formation of sodium aluminosilicate hydrate ("NASH") chains, which in turn, may cross-link or entangle with CASH chains to enable strain hardening and strengthening of the cement matrix. Sodium hydroxide may behave as an alkali activator to reduce cement setting time and improve initial mechanical strength of the cement. Accordingly, in addition to sulfur, 3DG carbons may be doped with sodium, to offer synergistic benefits during initial hydration and setting processes.

In some implementations, an example cement composition may include ordinary Portland cement ("OPC"), volcanic or pyroclastic (pozzolana) ash with about 70% replacement level of OPC, and chemically functionalized 3DG carbons. An example cement composition may include 3DG carbons surface functionalized with an alkali such as sodium. Another example cement composition may include 3DG carbons functionalized with sulfur oxide (S—O) species. 3DG carbons may be functionalized with elements including oxygen, nitrogen, silicon, or hardening agents. 3DG carbons may be functionalized in situ—that is, within the reactor during the production of 3DG carbons. In some implementations, 3DG carbons may be functionalized using separate post-production processing steps. For example, 3DG carbons may be treated with ozone to surface oxidize the carbon. Ozone oxidation may produce oxygen-containing functional groups in and/or on the surfaces of 3DG carbons described herein. The oxygen containing functional groups on the 3DG carbons may include one or more of epoxide (C—O—C, two carbons and oxygen forming a three-membered ring structure), hydroxyl (—OH), ether (C—O—C), ketone (O—C=O), or carboxylic acid (—COOH) groups. The approximate oxygen content associated with the oxygen containing functional groups and measured using interstitial gas analysis (IGA-O) may be between about 1 wt % and about 25 wt %. The approximate atomic content of oxygen (O)-containing functional groups may be between about 10 at % and 50 at %. Using X-ray photoelectron spectroscopy ("XPS") composition measurements, the C—O—C functional group concentration on 3DG carbons may be between about 45 at % and 55 at %. The C—C functional groups concentration may be between about 45 at % and about 55 at % and the O—C=O functional group concentration may be between about 5 at % and about 10 at %. One or more of the example functional groups described herein may be disposed as surface functional groups on 3DG carbons. In other implementations, one or more of the example functional groups described herein may be disposed within the porous structure of the 3DG carbons.

In some other implementations, the 3DG carbons including oxygen functional groups as described above may be further postprocessed to functionalize the oxidized surface of the carbon with silane through a modification of the Stobbe colloidal silica synthesis. Furthermore, the surfaces of 3DG carbons may be functionalized with silica, oxygen or nitrogen containing species which form bonds with polymers of the cementitious matrix, thus improving adhesion and providing strong binding to enhance the strength of cementitious product.

In some implementation, the 3DG carbons may be used without any post-production processing steps. In other implementations, the 3DG carbons may be subject to post-product processing steps. Example post-production processing steps may include one or more of mechanical processing steps such as ball milling, grinding, attrition milling, micro fluidizing, or other processes to reduce particle size. Post-production processing steps may also include one or more exfoliation processes such as sheer mixing, chemical etching, oxidizing (e.g., Hummer method), thermal annealing, doping by adding elements during annealing (e.g., sulfur, nitrogen), steaming, filtering, or lyophilizing, or other processes. Some other examples of post-production processing may include sintering processes such as one or more of spark plasma sintering ("SPS"), direct current sintering, microwave sintering, or ultraviolet ("UV") sintering, which may be conducted at high pressure and temperature in an inert gas. In some other implementations, multiple post-production processing methods may be used in any combination to achieve desired physical and chemical properties of the 3DG carbons. For example, post-production processing may yield functionalized 3DG carbons as disclosed herein.

In some implementations, the 3DG carbons may be subjected to post-production thermal annealing or sintering in an inert environment such as nitrogen or argon and at elevated temperatures, and at atmospheric pressure, or under vacuum. Post-production processing temperatures may range from approximately 500° C. to 2500° C., or from approximately 500° C. to 1500° C., or from approximately 800° C. to 1500° C., or from approximately 800° C. to 1200° C., or from approximately 800° C. to 1000° C., or from approximately 2000° C. to 2400° C., or approximately at 800° C., or approximately at 1000° C., or approximately at 1500° C., or approximately at 2000° C., or approximately at 2400° C.

In some implementations, an example cement composition may include ordinary Portland cement ("OPC"), one or more of pyroclastic ash or metakaolin (calcined clay) or limestone as SCMs, and 3DG carbons surface functionalized with nano-silica particles or clusters. The amount of 3DG carbons functionalized with nano-silica may be less than approximately 1 wt % of the cement composition. The replacement level of OPC by the SCMs may be at least approximately 70%. The replacement level of OPC by the SCMs may be approximately 80%. An example cement composition may include approximately 20% OPC, approximately 80% SCM (metakaolin and limestone) and less than approximately 1 wt % of 3DG carbons functionalized with nano-silica. OPC may conform to European standards EN 197-1 as CEM I 42.5R or the ASTM Type I standard.

Metakaolin may be supplied by Burgess Pigment Company (Sandersville, GA) as Optipozz™ metakaolin. Limestone may be supplied by Omya, Inc. (Cincinnati, OH) as Durcal 15 powders.

Figure 5:
FIG. 5 shows micrographs of 3DG carbons functionalized with nano-silica particles and clusters, according to some implementations.
Figure 5:
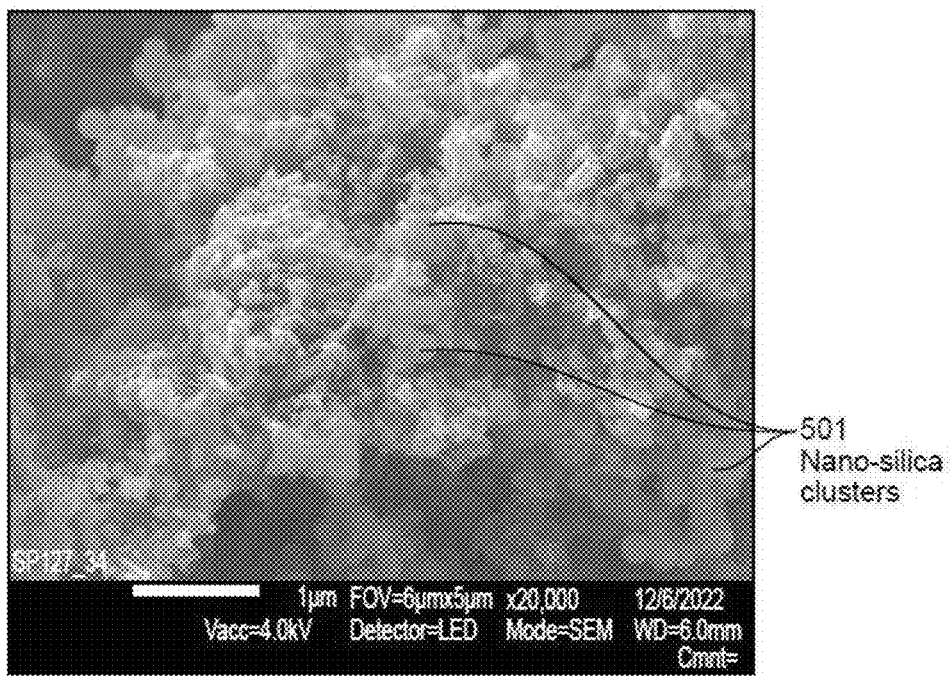
Figure 5:
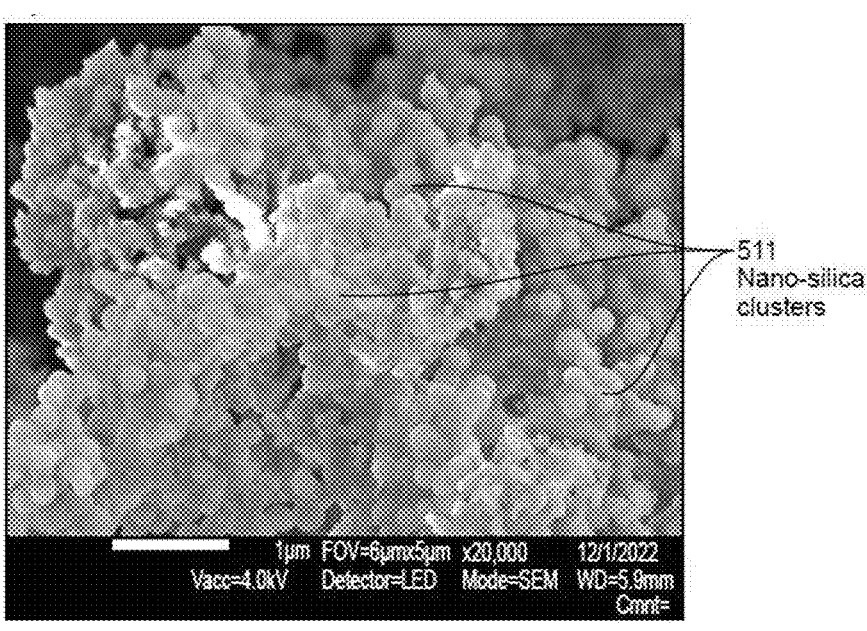

Without being bound by any particular theory, nano-silica particles anchored in 3DG carbons surfaces, micro-confined in the 3DG carbons, or nano-confined in the open porous scaffold structure 120 (see FIG. 1A) may act as a nucleating agent for CSH formed during the hydration process. FIG. 5 shows micrographs 500 and 510 of 3DG carbons functionalized with respective nano-silica particles and clusters, according to some implementations. That is, nano-silica particles or nano-silica particle clusters 501 and 511 in 3DG carbons in the example cement compositions may function as distributed catalytic sites, and as such, as seeding agents for CSH during hydration and subsequent growth of CSH polymeric chains in the cement matrix. The hydration process may be accelerated due to improved dissolution of C3S in water and acceleration of the pozzolanic activity of the SCMs to convert CH to CSH. Further 3DG carbons functionalized with nano-silica may anchor CSH polymeric chains and may provide structural reinforcement during hydration and setting.

In some implementations, an example cement composition may include ordinary Portland cement ("OPC"), one or more of pyroclastic ash or metakaolin or limestone as SCMs, and 3DG carbons surface functionalized with one or more of nano-silica and oxygen. The amount of 3DG carbons functionalized with one or more of nano-silica or oxygen may be less than approximately 1 wt % of the cement composition. The replacement level of OPC may be approximately 70%. 3DG carbons doped with oxygen may also nucleate CSH seeds via covalent bonding. The replacement level of OPC by the SCMs and functionalized 3DG carbons may be approximately 80%. An example cement composite may include approximately 20% OPC, approximately 80% SCM (metakaolin and limestone) and less than approximately 1 wt % of functionalized 3DG carbons functionalized with nano-silica and/or oxygen. OPC may conform to European standards EN 197-1 as CEM I 42.5R or ASTM Type I Portland cement. Metakaolin may be supplied by Burgess Pigment Company (Sandersville, GA) as Optipozz™ metakaolin. Limestone may be supplied by Omya, Inc. (Cincinnati, OH) as Durcal 15 powders.

In some implementations, an example cement composition may include ordinary Portland cement ("OPC"), one or more of pyroclastic ash, gypsum, limestone or metakaolin as SCMs, and 3DG carbons surface functionalized with one or more of nano-silica and oxygen. The replacement level of OPC may be at least approximately 70%. The amount of 3DG carbons functionalized with one or more of nano-silica or oxygen may be less than approximately 1 wt % of the cement composition. The amount of gypsum may range from approximately 0.5 wt % to 3.5 wt % of the cement composition. A superplasticizer may be used to improve workability. Superplasticizers may be added to the cement paste in concentrations ranging from 0.05% bwoc to 2% bwoc. The superplasticizer may include a polycarboxylate ether, for example, Arkema's Ethacryl product or BASF's Liquiment product. The superplasticizer may be added to the cement paste during hydration as a dispersant.

The example cement composition may further include rheology modifiers, that include, but are not limited to, hydroxyethylcellulose in a concentration range of between approximately 0.05% bwoc and approximately 1.0% bwoc. The replacement level of OPC by the SCMs and functionalized 3DG carbons may be approximately 80%. An example cement composition may include approximately 20% OPC, approximately 80% SCM (metakaolin and limestone) and less than approximately 1 wt % of 3DG carbons functionalized with nano-silica and/or oxygen. OPC may conform to European standards EN 197-1 as CEM I 42.5R or ASTM Type I Portland cement.

In some implementations, an example cement composition may include ordinary Portland cement ("OPC"), one or more of pyroclastic ash, gypsum, or metakaolin as SCMs and 3DG carbons functionalized with one or more of nano-silica and oxygen. The replacement level of OPC may be at least approximately 70 wt %. The replacement level of OPC may be between approximately 70 wt % and approximately 80 wt %. An example SCM may include approximately 65 wt % metakaolin, approximately 32 wt % limestone, and approximately 3 wt % gypsum. A superplasticizer may be used to improve workability. The amount of 3DG carbons functionalized with one or more of nano-silica or oxygen may be less than approximately 1 wt % of the cement composition. OPC may conform to European standards EN 197-1 as CEM I 42.5R or ASTM Type I Portland cement. During initial hydration (cement slurry formation with water), the water to cement ratio may vary between approximately 0.3 and approximately 0.5.

3DG carbons functionalized with nano-silica were analyzed using SEM/EDS for elemental analysis. FIG. 6A shows a micrograph 600A of untreated 3DG carbons, and FIGS. 6B, 6C, and 6D show micrographs 600B, 600C and 600D that confirm the presence of O and Si elements on 3DG carbons that were functionalized by silica.

Figure 7A:
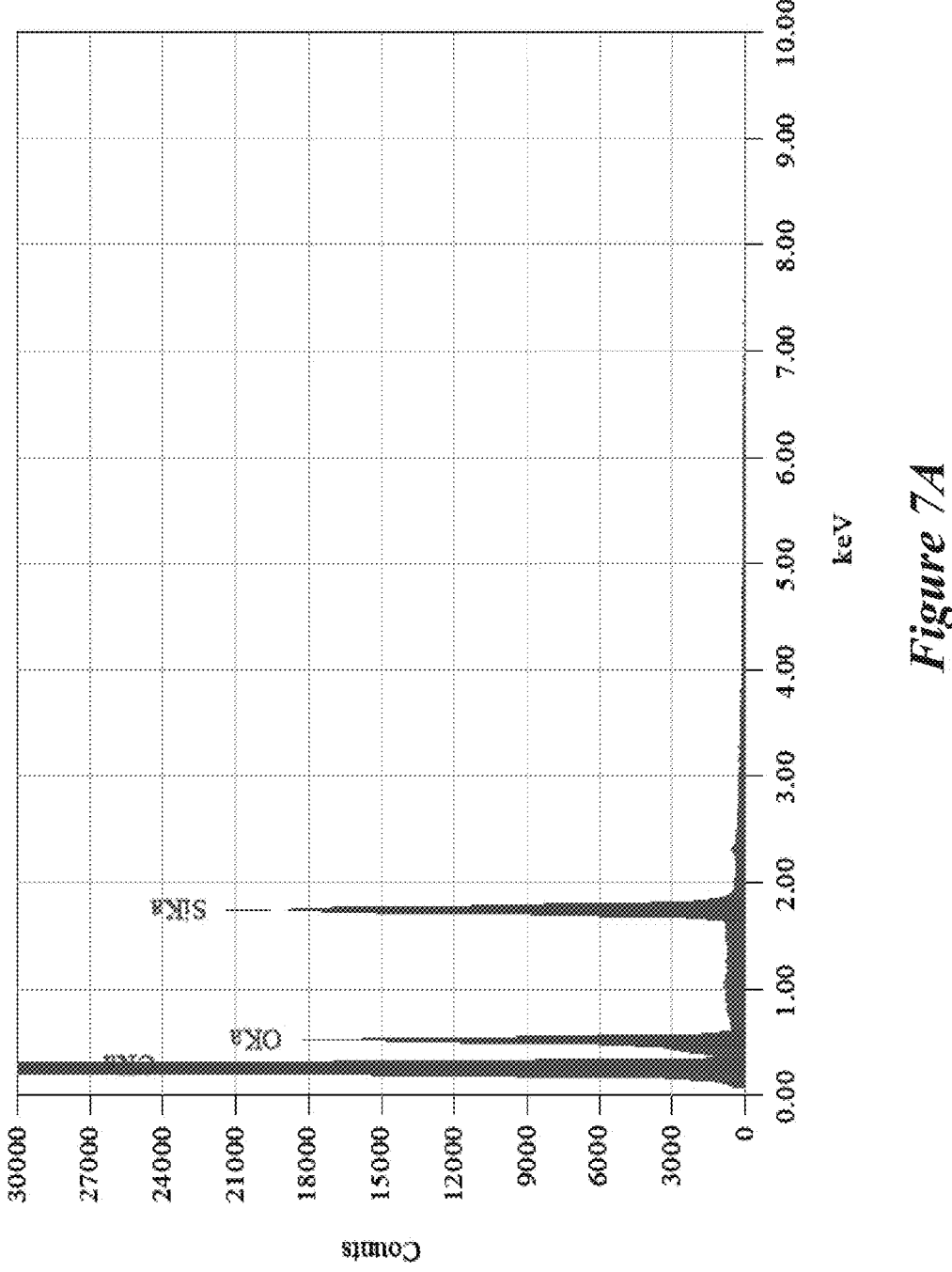
FIG. 7A shows elemental composition intensity (counts) measured during SEM/EDS analysis of 3DG carbons functionalized with nano-silica, according to some implementations.
Figure 7B:
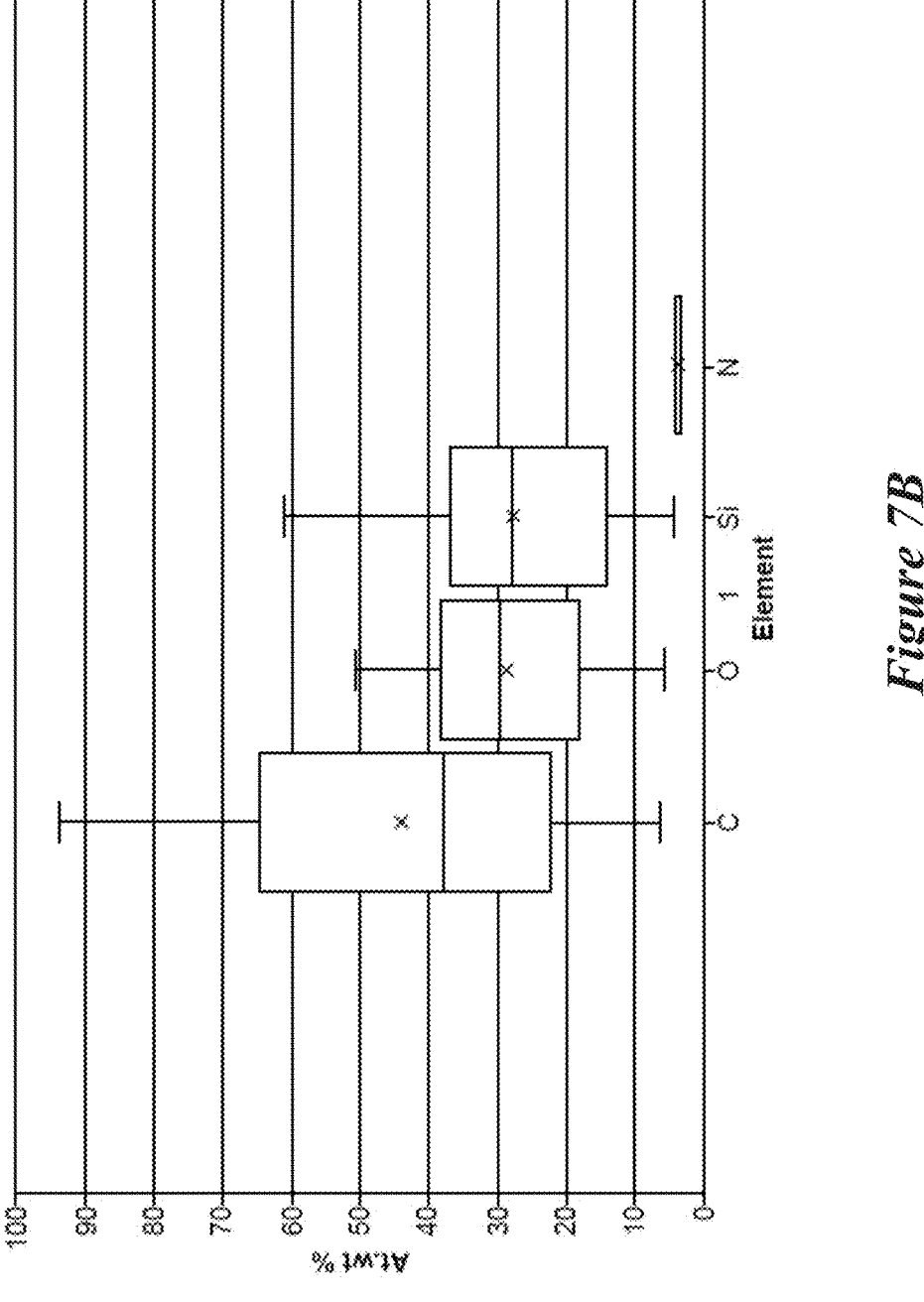
FIG. 7B shows a box plot of elemental composition distribution measured by SEM/EDS analysis of various 3DG carbons functionalized with nano-silica, according to some implementations.

FIG. 7A shows elemental composition intensity (counts) 700A measured during SEM/EDS analysis of 3DG carbons functionalized with nano-silica, according to some implementations, and FIG. 7B shows a box plot 700B of elemental composition distribution measured by SEM/EDS analysis of various 3DG carbons functionalized with nano-silica, according to some implementations. Quantitative analysis of the elemental composition intensity may suggest an interquartile range for Si concentration of between approximately 22 at. wt % and approximately 64 at. wt %, with an average of approximately 44 at. wt %, and that for oxygen concentration of approximately between 18 at. wt % and approximately 38 at. wt %, with an average of approximately 29 at. wt %. The 3DG carbons surface functionalized with nano-silica may include between approximately 20 at. wt % and approximately 65 at. wt % Si, and between approximately 15 at. wt % and approximately 40 at. wt % O.

The presence of carbon during SEM/EDS analysis suggests that some areas of the 3DG carbons remain in an unfunctionalized state. The O/Si atomic ratio (not shown) had an interquartile range for Si concentration of between approximately 1.6 and approximately 2.8, with an average of approximately 2.5, which suggests that some elemental oxygen does not derive from silica (O/Si ratio of 2), but corresponds to oxygenated 3DG carbons (for example, graphene oxides). The O/Si ratio of 3DG carbons surface functionalized with nano-silica may be between approximately 1.5 and approximately 3.

Figure 8:
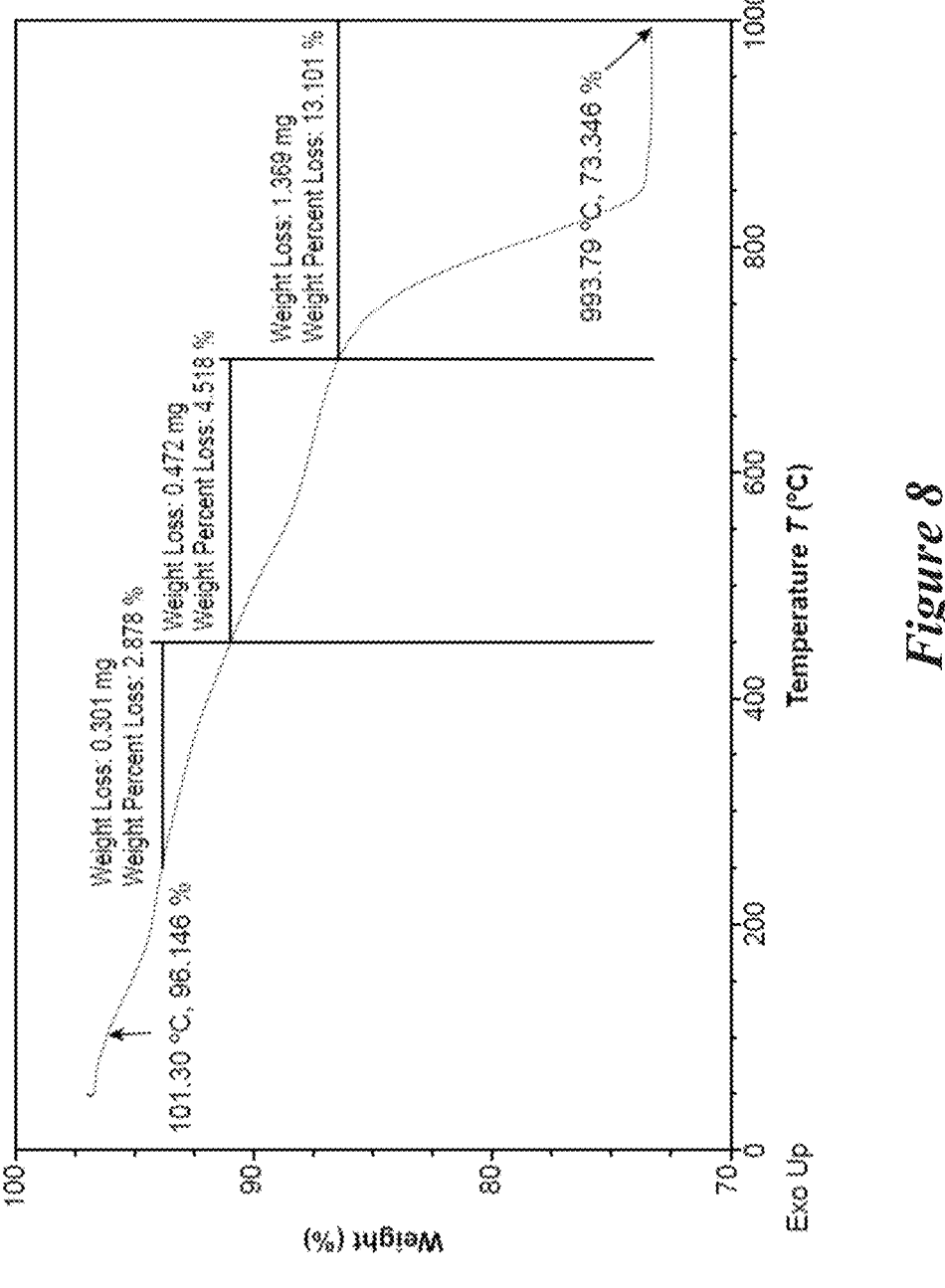
FIG. 8 shows a thermogram of example cement compositions functionalized with nano-silica, according to some implementations.

FIG. 8 shows a thermogram 800 of example cement compositions functionalized with nano-silica, according to some implementations. Samples of example cement compositions with 3DG carbons were subjected to thermogravimetry analysis (TGA). The example thermogram 800 of FIG. 8 suggests that between approximately 250° C. and 450° C., degradation of the chemical moiety that connects silica to the 3DG carbon surfaces occurs. Silanol groups present on the surface of nano-silica particles and clusters may degrade between approximately 450° C. an approximately 700° C. and carbon may degrade at between approximately 700° C. and approximately 1000° C. leaving behind inorganic silica residue.

In some implementations, an example method for regulating CSH nucleation and time-lapsed growth during the initial hydration of cement may include providing one or more of the example compositions previously described and mixing and mixing with water, where the water to cement ratio by weight may be vary between approximately about 0.3 and about 0.5. For example, a cement composition may include ordinary Portland cement, a secondary cementitious material (SCM) including one or more of metakaolin or limestone or gypsum in an amount corresponding to at least approximately 70% replacement level of ordinary Portland cement, and less than approximately 1 wt % of 3DG carbons. The 3DG carbons may include few layer graphene ("FLG") nanoplatelets orthogonally joined to each other to form a 3D porous graphene scaffold structure, where the 3DG carbons ae surface functionalized with one or more of nano-silica or oxygen. An SCM may include approximately 65 wt % metakaolin, approximately 32 wt % limestone, and approximately 3 wt % gypsum.

In some implementations, 3DG carbons may include aggregates of primary carbon particles that include carbon nano-onions (CNOs) and other allotropes. The primary carbon nanoparticles may include two or more connected multi-walled spherical fullerenes (MWSF). CNOs or multi-walled fullerenes are carbon nanoparticles, generally spherical in shape, and may include multiple concentric shells including graphene that defining a plurality of porous regions or zones nested within each other. The primary carbon nanoparticles may be characterized by a high degree of order (e.g., a Raman signature with an $I_D/I_G$ ratio from 0.95 to 1.05), and a high purity (e.g., the ratio of carbon to other elements, other than H, is greater than 99.9%). Layers of graphene may coat the connected CNOs in each primary carbon nanoparticle. The one or more shells and carbonaceous regions may include $sp^2$-hybridized carbon (indicative of graphene) and may have minor islands of amorphous $sp^3$-hybridized carbon.

Synthesis and/or growth of 3DG carbons including CNOs may be produced by thermal cracking of hydrocarbon feedstock as disclosed by Riso et al., "Cracking of a Process Gas," U.S. Pat. No. 9,862,602, filed on Mar. 27, 2017, Cook, et al., "Carbon Allotropes", U.S. Pat. No. 10,112,837, filed on Oct. 26, 2017, Cook et al. "Method and Apparatus for Cracking of a Process Gas," U.S. Pat. No. 11,053,121, filed Oct. 18, 2018, and Cook, et al. "Carbon Allotropes," U.S. Pat. Pub. No. 2021/0292170, filed Jun. 3, 2021, which are incorporated by reference herein in each of their entireties. The 3DG carbons including CNOs may also be surface functionalized as previously described herein.

Figure 9A:
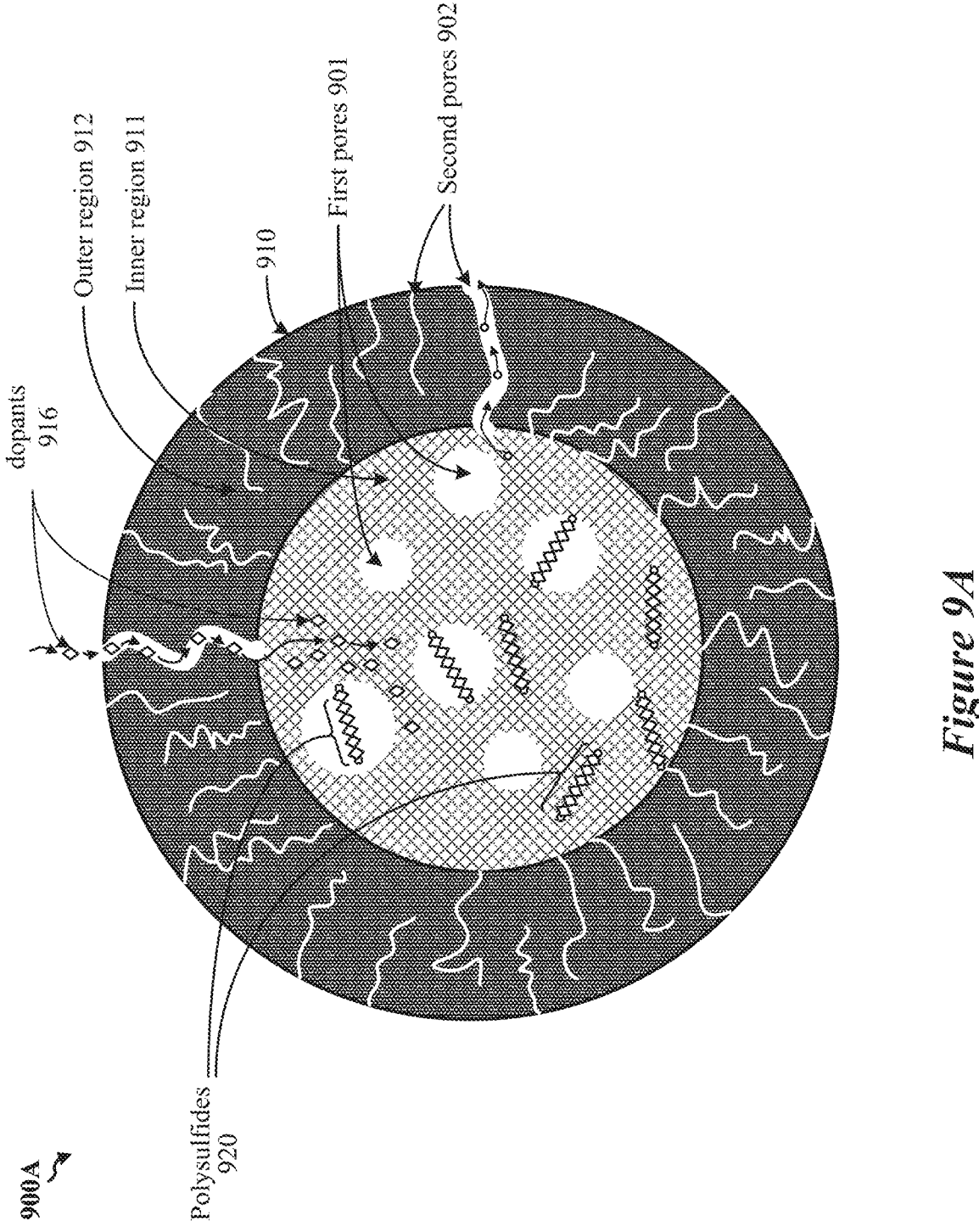
FIG. 9A shows a diagram of an example primary carbon particle in 3DG carbons, according to some implementations.

FIG. 9A shows a diagram of an example primary carbon nanoparticle 900A in 3DG carbons, according to some implementations. The primary carbon nanoparticle 900A includes an inner region 911 surrounded by an outer region 912. The outer region 912 includes an outer boundary 910 of the primary carbon particle 900A. The inner region 911 may include a plurality of first pores 901 dispersed therein, and the outer region 912 may include a plurality of second pores 902 dispersed therein. The inner region 911 and outer region 912 may be interconnected by at least some of the first pores 901. The inner region 911 may be associated with a first pore density, and the outer region 912 may be associated with a second pore density that is different than the first pore density. The first pores 901 may be configured to confine dopants 916 to be released as a function of time (time release) during hydration of cement, and the second pores 902 may provide pathways or channels for transport of dopants 916 into and from the primary particle 900A (and for pre-loading dopants into the primary carbon particle 900A. Example primary carbon nanoparticles may be characterized by a size or principal dimension (diameter, length, width) of less than approximately 200 nm. In some instances, polysulfides 920 may be present within the primary carbon particle 900A.

Figure 9B:
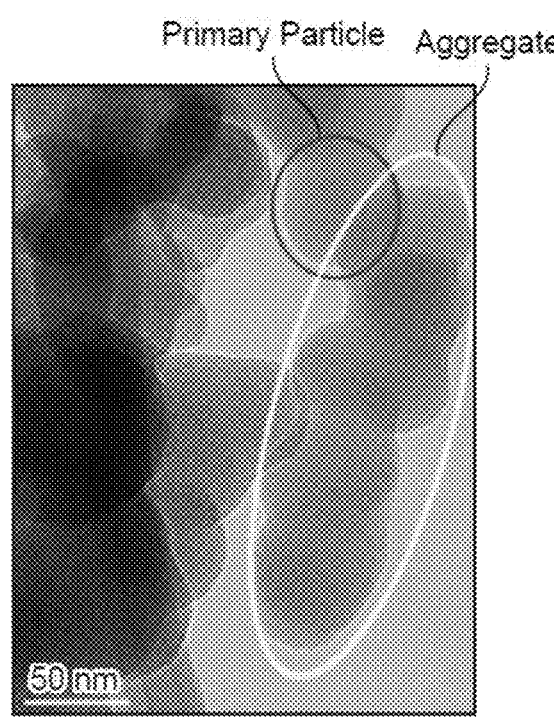
FIG. 9B shows a TEM image of primary particles and aggregates in 3DG carbons, according to some implementations.

FIG. 9B shows a TEM image 900B of a carbon aggregate 930, according to some implementations. As shown, the carbon aggregate 930 may include a plurality of primary carbon nanoparticles 932 that resemble a "string-of-pearls." In some implementations, the size or principal dimension of carbon aggregate 930 may be between about 50 nm and 500 nm. Primary carbon nanoparticles 932 may be of any shape, including one or more of spherical, spheroidal, dumbbell, cylindrical, elongated cylindrical type, rectangular prism, disk, wire, or irregular. In some implementations, the primary nanoparticles 932 may be formed of formed of concentric, well-ordered spheres of $sp^2$-hybridized carbon atoms as contrasted with spheres of poorly-ordered, nonuniform, amorphous carbon particles. In the primary nanoparticles 932, pore sizes may gradually decrease along a radial direction from the center of the particle to the outer boundary of the particle. In some example implementations, a multi-shell CNO primary particle may be characterized by a range of pore sizes and pore distributions in each region. The primary nanoparticles 932 and/or carbonaceous layers may also include one or more of few layer graphene (FLG) interconnected platelets, multi-layer graphene (MLG) interconnected platelets, graphite, carbon nano-tubes (CNTs), flat graphene, or wrinkled graphene. The example primary carbon nanoparticles 932 may be characterized as non-hollow carbon spherical particles. In some other implementations, the primary carbon nanoparticles 910 may also include tri-zone particles.

Figure 9C:
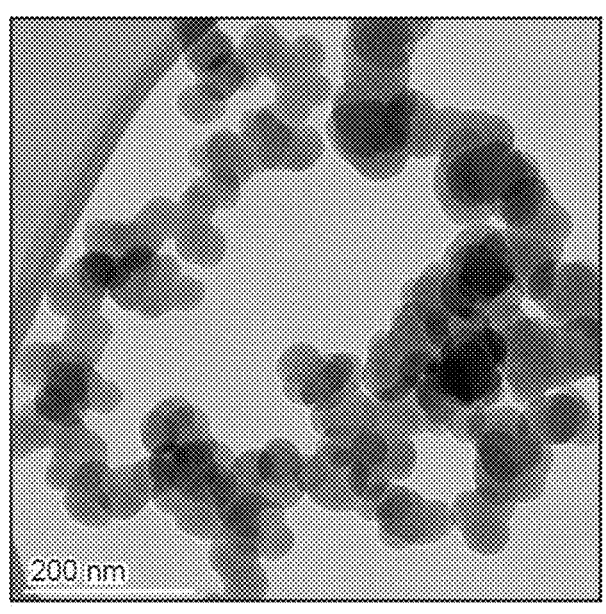
FIG. 9C shows a TEM image of 3DG carbon agglomerates, according to some implementations.

FIG. 9C shows a TEM image of 3-dimensional carbon agglomerates 900C, according to some implementations. The agglomerates 900C may be dispersed in any one of the example cement compositions previously described. In some instances, 3DG carbons that form the agglomerates 900C may be functionalized with one or more of oxygen containing functional groups, other functional groups, or atoms, as previously described.

Figure 10:
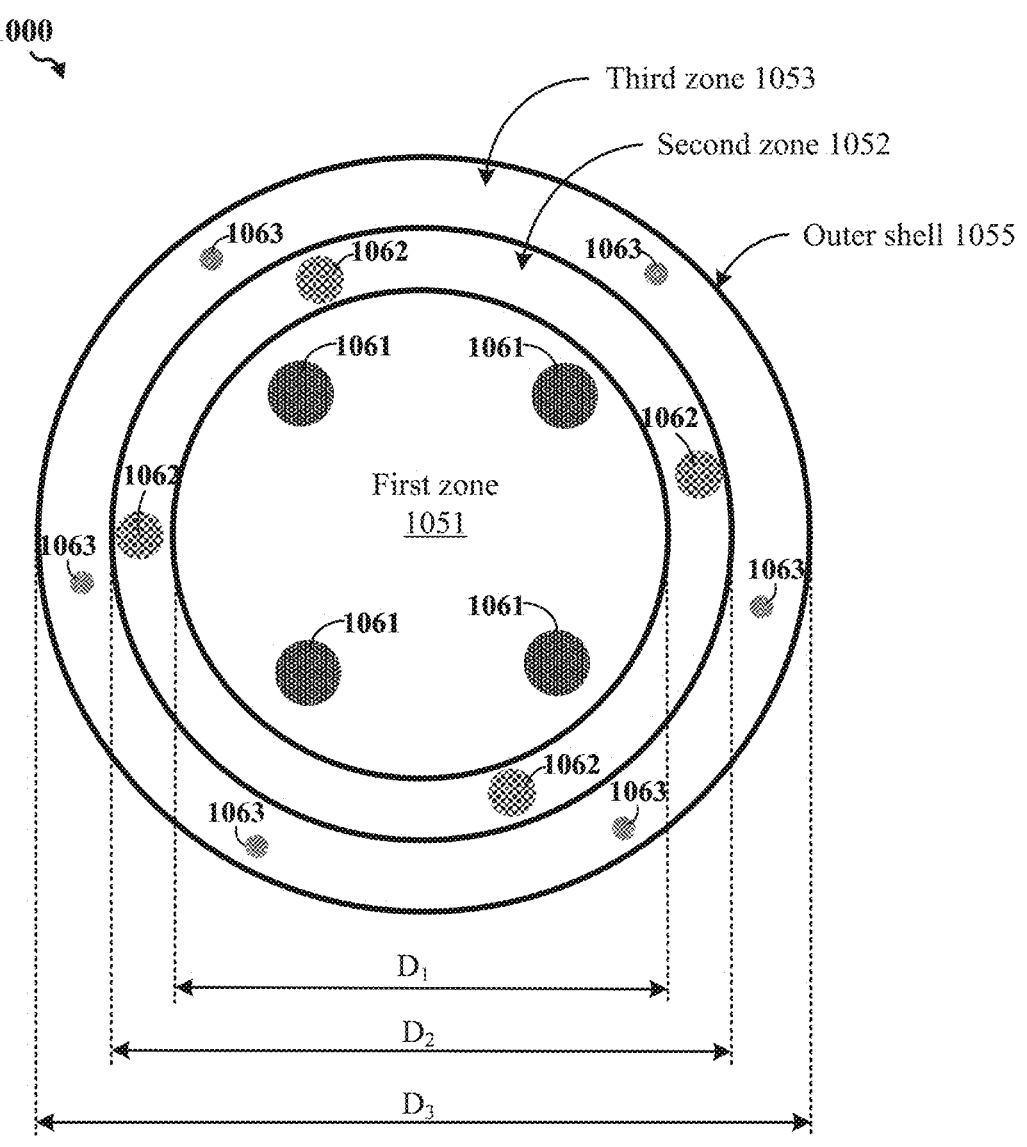
FIG. 10 shows a diagram of another example primary carbon particle in 3DG carbons, according to some implementations.

FIG. 10 shows a diagram of another example primary carbon nanoparticle 1000 in 3DG carbons, according to some implementations. The example primary carbon nanoparticle 1000 may include a first zone 1051 nested within a second zone 1052, which in turn is nested within a third zone 1053. The first zone 1051 may include pores having a size or principal dimension (diameter, length width) of less than approximately 40 nm, the second zone 1052 may include pores having a principal dimension of less than approximately 35 nm, and the third zone 1053 may include pores having a principal dimension of less than approximately 30 nm. In some instances, the pores 1061 within the first zone 1051 may be characterized as macropores, the pores 1062 within the second zone may be characterized as mesopores, and the pores 1063 within the third zone 1053 may be characterized as micropores.

In some aspects, the principal dimension D1 of first zone 1051 may be less than approximately 100 nm, the principal dimension D2 of second zone 1052 may be less than approximately 150 nm, and the principal dimension D3 of third zone 1053 may be approximately 200 nm. The relative dimensions, porosities, and electrical conductivities of the first zone 1051, the second zone 1052, and the third zone 1053 may be tuned by tuning reactor operating conditions to obtain desired particle or aggregate structure, porosity and particle density. The first zone 1051 may have a density of carbonaceous material of less than approximately 1 g/cc. The third zone 1053 is bounded by an outer shell 1055 and may have a density of carbonaceous material between approximately less than 1 g/cc and 3.5 g/cc. The second zone 1052 may have a density of carbonaceous material between approximately 0.5 g/cc and 3 g/cc. The one or more shells and carbonaceous regions may include $sp^2$-hybridized carbon (indicative of graphene) and may have minor islands of amorphous $sp^3$-hybridized carbon.

EXAMPLES

In the examples described below, 3DG carbons were characterized by a surface oxygen concentration of between about 4 at % and 5 at % as measured by X-ray photoelectron spectroscopy ("XPS").

Example 1. Compressive Strength of Mortar Samples Including Cement Compositions Including the Example 3DG Carbons Mortar samples (or specimens) of Dyckerhoff CEM I 42.5R Portland cement were prepared by mixing cement with water containing about 0.2 wt % (bwoc) BASF Liquiment 5581F superplasticizer, and at a water/cement ratio of about 0.485. To prepare a suspension of 3DG carbons in water, the 3DG carbons was added to water in the appropriate quantity and sonicated in a Branson sonicating bath for 10 min. at a quantity sufficient to yield the targeted 3DG content (bwoc) in cement. The target 3DG content in cement compositions included 0.1%, 0.2%, 0.25% and 1.0% bwoc. The suspension of 3DG carbons was then added to the mortar samples and mixed.

The compressive strength of the mortar samples including cement with varying 3DG carbon concentrations was measured using standard test protocol "Standard Test Method for Compressive Strength of Hydraulic Cement Mortars," ASTM C109. Compressive strength was measured at 1, 3, 7, and 28 days.

Figure 11:
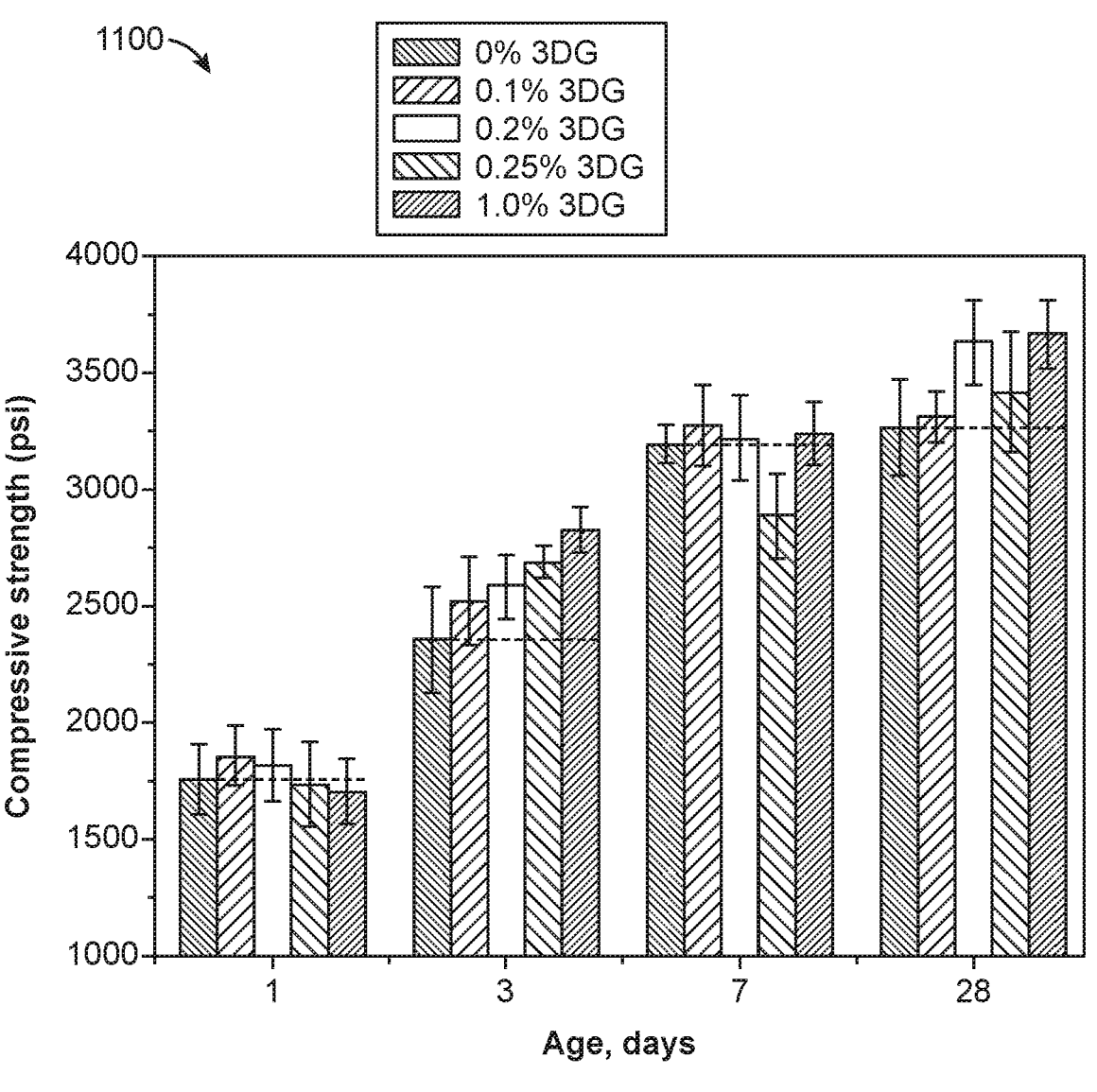
FIG. 11 shows a plot comparing the compressive strength of mortar samples including cement with varying 3DG carbon carbons, according to some implementations.

FIG. 11 shows a plot 1100 comparing the compressive strength of mortar samples including cement with varying amounts of 3DG carbons, according to some implementations. As can be seen, the addition of 3DG carbons increased the compressive strength of the mortar samples. At 28 days, the compressive strength of the mortar samples increased from about 3250 psi (sample with no 3DG carbons) to about 3625 psi (1% 3DG carbons bwoc), resulting in an increase of about 11.5% in compressive strength.

Example 2. Early Age Compressive Strength of Mortar Samples Including Blended Cement Compositions Including the Example 3DG Carbons Mortar samples (or specimens) of Dyckerhoff CEM I 42.5R Portland cement blended with metakaolin, limestone, and gypsum were prepared by mixing cement blends with water containing about 0.2 wt % (bwoc) BASF Liquiment 5581F superplasticizer, and at a water/cement ratio of about 0.485. To prepare a suspension of 3DG carbons in water, the 3DG carbons was added to water in the appropriate quantity and sonicated in a Branson sonicating bath for 10 min. at a quantity sufficient to yield the targeted 3DG content (bwoc)

in cement. The target 3DG content in cement compositions included 0.05%, 0.1%, and 0.15% bwoc. The suspension of 3DG carbons was then added to the mortar samples and mixed. Mortar samples including the 3DG carbons included about 35% metakaolin, about 20% limestone, and about 3% gypsum (calcium sulfate dihydrate) on a bwoc basis. As such, the replacement level of cement in these test samples was about 55%. In addition, mortar samples using cement blends having no 3DG carbons were also prepared. A first reference sample included about 35% metakaolin, about 20% limestone, and about 3% gypsum on a bwoc basis. As such, the replacement level of cement in the first reference sample was about 55%. A second reference sample included about 30% metakaolin, 15% limestone and 3% gypsum on a bwoc basis. As such, the replacement level of cement in the second reference sample was about 45%.

The compressive strength of the mortar samples including cement with varying 3DG carbon contents was measured using standard test protocol "Standard Test Method for Compressive Strength of Hydraulic Cement Mortars," ASTM C109. Compressive strength was measured at 1, 3, and 7 days.

Figure 12:
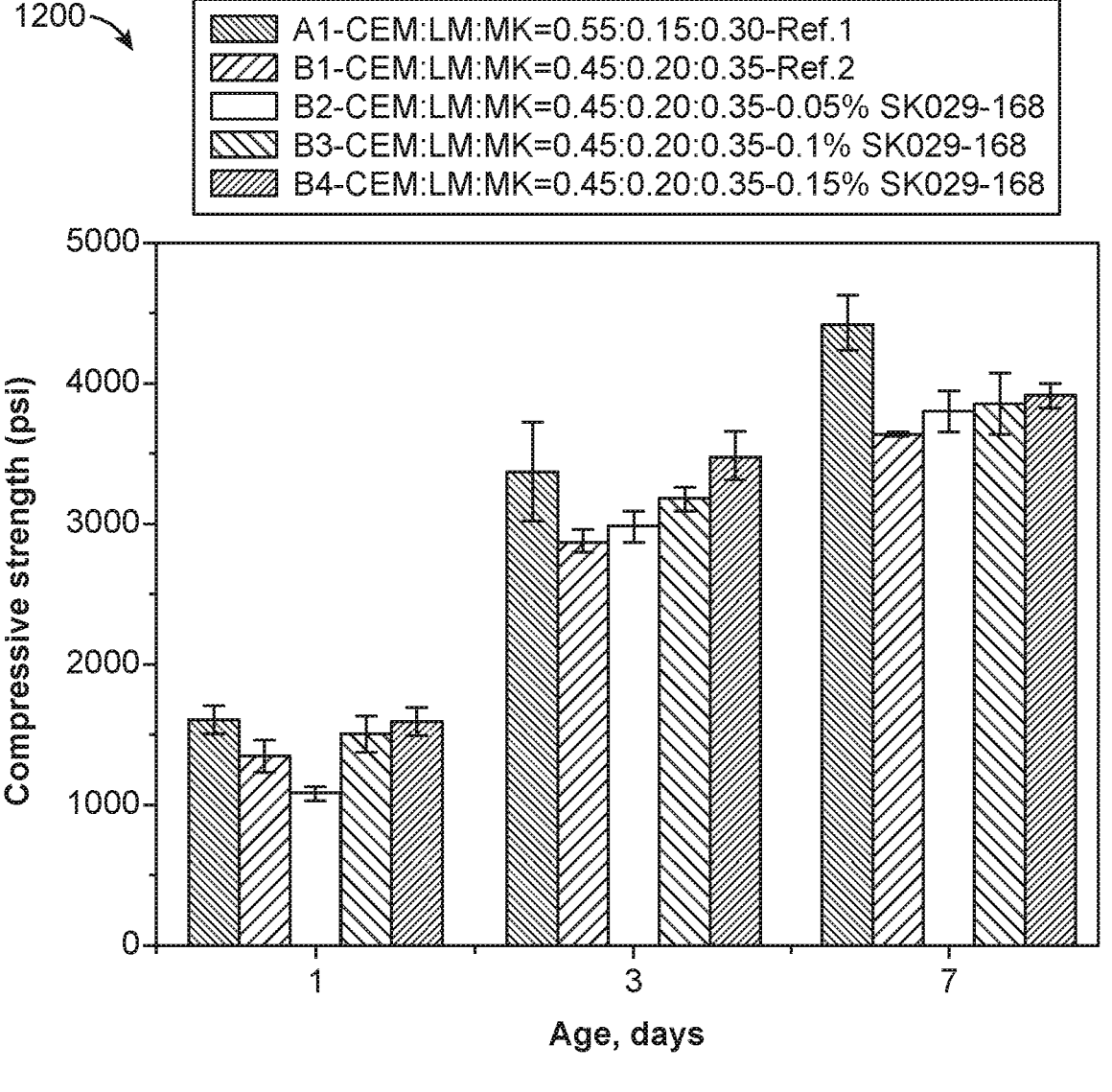
FIG. 12 shows a plot comparing the early age compressive strength of mortar samples including cement with varying 3DG carbon carbons according to some implementations.

FIG. 12 shows a plot 1200 comparing the early age compressive strength of mortar samples including cement with varying amounts of 3DG carbons, according to some implementations. As can be seen, the addition of 3DG carbons increased the compressive strength of the mortar samples characterized by a cement replacement level of about 55%.

Example 3. Water Absorption Rates in Mortar Samples Including Blended Cement Compositions Including the Example 3DG Carbons Mortar samples (or specimens) of Dyckerhoff CEM I 42.5R Portland cement blended with metakaolin, limestone, and gypsum were prepared by mixing cement blends with water containing about 0.2 wt % (bwoc) BASF Liquiment 5581F superplasticizer, and at a water/cement ratio of about 0.485. To prepare a suspension of 3DG carbons in water, the 3DG carbons was added to water in the appropriate quantity and sonicated in a Branson sonicating bath for 10 min. at a quantity sufficient to yield the targeted 3DG content (bwoc) in cement. The target 3DG content in cement compositions was about 0.3% bwoc. The suspension of 3DG carbons was then added to the mortar samples and mixed. The composition of mortar samples prepared for testing is summarized in Table 1 below:

TABLE 1

| | Composition of mortar samples bwoc prepared for water absorption tests | | | | |
|---|---|---|---|---|---|
| Sample ID | Cement (%) | Metakaolin (%) | Limestone (%) | Gypsum (%) | 3DG carbons (%) |
| R0-0 (reference) | 100% | | | | |
| R60-0 | 40% | 20% | 40% | 3% | |
| R60-3 | 40% | 20% | 40% | 3% | 0.3% |

As such, the replacement level of cement in test samples R60-0 and R60-3 was about 60%. Water absorption rates of the mortar samples including cement with varying 3DG carbon contents were measured using standard test protocol "Standard Test Method for Measurement of Rate of Absorption of Water by Hydraulic-Cement Concretes," ASTM C1585. For testing purposes, samples with compositions as shown in Table 1 were prepared as 4 in. (diameter)×8 in. (length) cylinders and cured in limewater at about 23° C. for 28 days. The cured samples were then cut into discs of about 2 inches thick.

Figure 13:
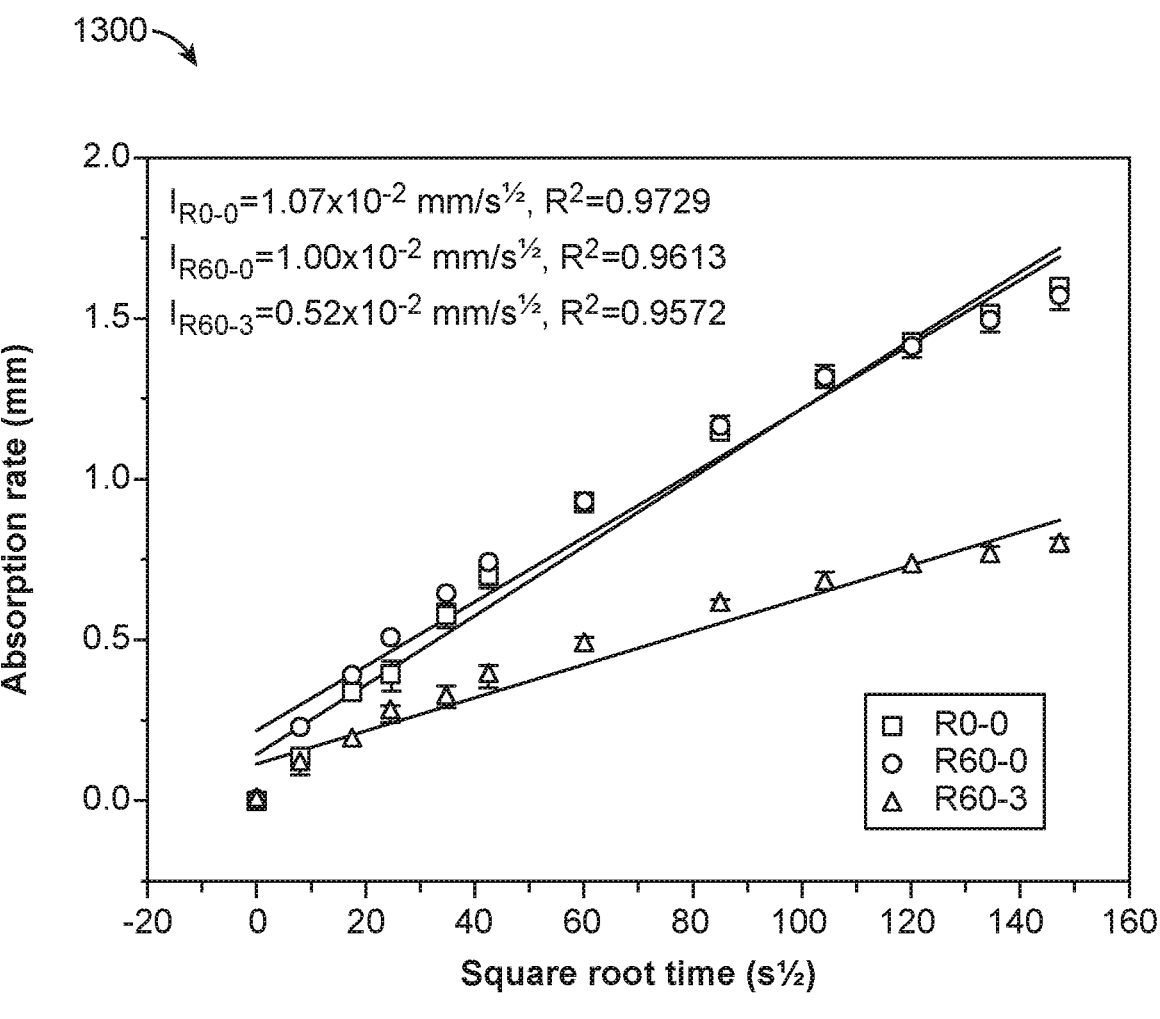
FIG. 13 shows a plot comparing the water absorption rate of mortar samples including cement with varying amounts of 3DG carbons, according to some implementations.

FIG. 13 shows a plot 1300 comparing the water absorption rate of mortar samples including cement with varying amounts of 3DG carbons, according to some implementations. As can be seen, the water absorption rate (initial sorptivity over the first 6 hours) of the reference sample and the sample without any 3DG carbons were found to be similar. However, with the addition of 0.3% 3DG carbons, the water absorption rate at x-axis values (square root of time in seconds) greater than about 80 ($s^{1/2}$) of the R60-3 sample decreased by more than 100% to less than 1 mm at a square root time greater than 80 $s^{1/2}$.

Example 4. Rate of Chloride Ion Penetration Tests ("RCPT") in Mortar Samples Including Blended Cement Compositions Including the Example 3DG Carbons Mortar samples as described in Example 3 were subjected to RCPT tests using standard test protocol "Standard Test Method for Electrical Indication of Concrete's Ability to Resist Chloride Ion Penetration," ASTM C1202.

Figure 14:
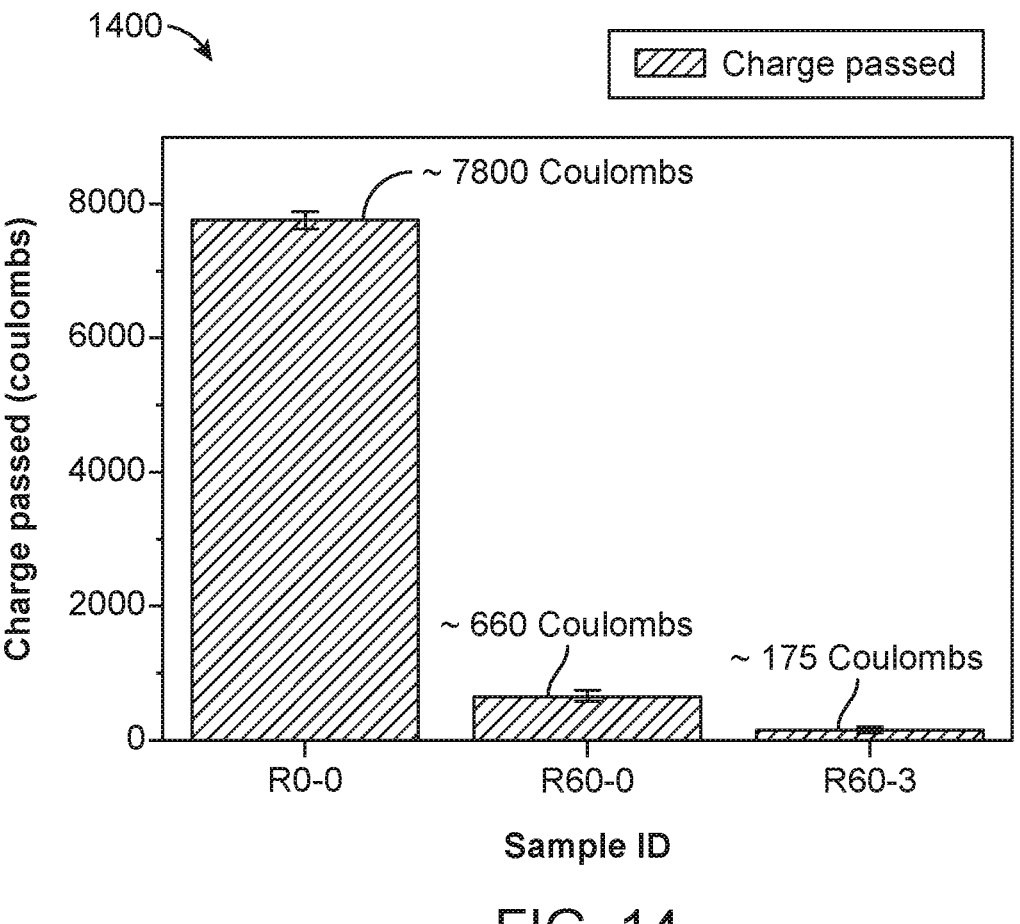
FIG. 14 shows a plot comparing the charge passed through mortar samples during rate of chloride ion penetration tests ("RCPT") including cements with varying amounts of 3DG carbons, according to some implementations.

FIG. 14 shows a plot 1400 comparing the charge passed through mortar samples during RCPT including cements with varying amounts of 3DG carbons, according to some implementations. As can be seen, the reference sample R0-0 showed the highest charge passed through value of about 7800 coulombs, which is indicative of high chloride ion penetration across the sample. Sample R60-0 showed a moderate charged passed through value of about 660 coulombs. In contrast, sample R60-3 including about 0.3% 3DG carbons, and with a 60% cement replacement showed the lowest charge passed through value of about 175 coulombs. These results demonstrate that cement compositions or mortars including 3DG carbons may significantly improve resistance to chloride penetration.

Example 5. Rate Chloride Migration Test ("RCM") in Mortar Samples Including Blended Cement Compositions Including the Example 3DG Carbons Mortar samples as described in Example 3 were subjected to RCM tests using test protocol NT Build 492. During testing under NT Build 492, the samples were saturated in limewater. The NT Build 492 test protocol may be viewed as an alternative to ASTM C1202 and is generally used to examine non-steady state chlorine migration in mortar or concrete samples.

Figure 15:
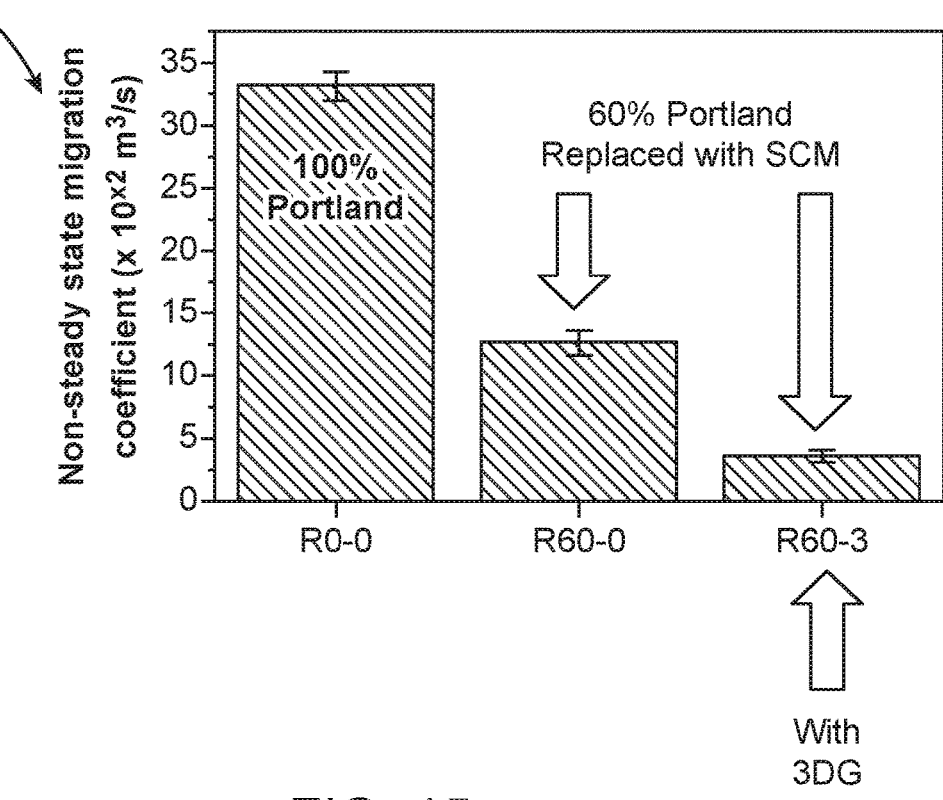
FIG. 15 shows a plot comparing the non-steady state chloride migration coefficient during rate of chloride migration ("RCM") tests through mortar samples including cements with varying amounts of 3DG carbons, according to some implementations.

FIG. 15 shows a plot 1500 comparing the non-steady state chloride migration coefficient during RCM tests through mortar samples including cements with varying amounts of 3DG carbons, according to some implementations. As can be seen, the non-steady state migration coefficient ("D") for sample R60-3 including 3DG carbons was less than $5 \times 10^{12}$ $m^2/s$, which corresponds to about 6× reduction over the value of coefficient D for the R0-0 sample. The coefficient D may be considered to be an indicator of non-steady state chloride permeability and may be calculated using the equation shown in FIG. 15.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. Unless otherwise specified in this disclosure, for construing the scope of the term "about" or "approximately," the error bounds associated with the values (dimensions, operating conditions etc.) disclosed is ±10% of the values indicated in this disclosure. The error bounds associated with the values disclosed as percentages is ±1% of the percentages indicated. The word "substantially" used before a specific word includes the meanings "considerable in extent to that which is specified," and "largely but not wholly that which is specified."

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above in combination with one another, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

What is claimed is:

1. A cement composition including:
ordinary Portland cement;
a secondary cementitious material (SCM) including one or more of metakaolin, limestone, or gypsum in an amount between approximately 45% and approximately 70% of a replacement level of ordinary Portland cement;
a superplasticizer in a concentration range of between approximately 0.05% by weight of cement (bwoc) and 2% bwoc; and
aggregates of mesoporous carbon nanoparticles (3DG carbons) in an amount of between approximately 0.05% bwoc and 2% bwoc, wherein the 3DG carbons include oxygen containing functional groups disposed on one or more of the surfaces of the 3DG carbons or within the 3DG carbons.

2. The cement composition of claim 1, wherein the 3DG carbons include one or more interconnected bundles of electrically conductive graphene layers.

3. The cement composition of claim 2, wherein the graphene layers are arranged as one or more stacks connected to each other to define a 3D porous scaffold structure including mesopores.

4. The cement composition of claim 3, wherein the one or more stacks are disposed substantially orthogonal to each other.

5. The cement composition of claim 2, wherein the graphene layers are characterized by a linear dimension of between approximately 50 nm and 200 nm.

6. The cement composition of claim 5, wherein the graphene layers include one or more of single layer graphene (SLG), few layer graphene (FLG), or many layer graphene (MLG).

7. The cement composition of claim 1, wherein the 3DG carbons are characterized by a Raman spectroscopy signature having an $I_D/I_G$ ratio between approximately 0.95 and 1.05.

8. The cement composition of claim 1, wherein the 3DG carbons are characterized by a Brunauer-Emmett-Teller (BET) surface area between approximately 50 m$^2$/g and 300 m$^2$/g measured using nitrogen gas.

9. The cement composition of claim 1, wherein the 3DG carbons are characterized by a graphene to amorphous carbon ratio of between approximately 1% and 95%.

10. The cement composition of claim 1, wherein the 3DG carbons are characterized by an electrical conductivity of between approximately 500 S/m and 20,000 S/m when compressed at pressure of approximately 12,000 pounds per square inch (psi).

11. The cement composition of claim 1, wherein the oxygen containing functional groups includes one or more of epoxide (C—O—C), hydroxyl (—OH), ether (C—O—C), ketone (O—C=O), or carboxylic acid (—COOH) groups.

12. The cement composition of claim 1, wherein an oxygen concentration associated with the oxygen containing functional groups is between approximately 1 wt % and 25 wt %.

13. The cement composition of claim 1, wherein an oxygen concentration associated with the oxygen containing functional groups disposed on the surface of the 3DG carbons is between approximately 4 atomic percentage (at %) and 5 at %.

14. The cement composition of claim 1, wherein the superplasticizer includes one or more of polycarboxylate ether, sulfonated naphthalene formaldehyde condensate, sulfonated melamine formaldehyde condensate, or acetone formaldehyde condensate.

15. A method of making a mortar including a cement composition, the method including:
forming a first mixture by mixing a cement blend with water at a water to cement ratio by weight of between approximately 0.3 and 0.5, wherein the cement blend includes:
ordinary Portland cement;
a secondary cementitious material (SCM) including one or more of metakaolin, limestone, or gypsum in an amount up to approximately 70% of a replacement level of ordinary Portland cement; and a superplasticizer in a concentration range of between approximately 0.05% by weight of cement (bwoc) and 2% bwoc; and mixing a suspension of aggregates of mesoporous carbon nanoparticles (3DG carbons) in water into the first mixture, wherein the 3DG carbons include oxygen containing functional groups disposed on one or more of the surfaces of the 3DG carbons or within the 3DG carbons.

16. The method of claim 15, wherein an amount of 3DG carbons in the mortar is between approximately 0.05% bwoc and 2% bwoc.

17. The method of claim 15, wherein the SCM includes between approximately 20 wt % and 35 wt % metakaolin bwoc, between approximately 15% and 40 wt % limestone bwoc, and between approximately 0.5 wt % and 3.5 wt % gypsum bwoc.

18. The method of claim 17, wherein a water absorption rate of the mortar measured using ASTM C1585 is less than 1 mm at a square root time greater than 80 $s^{1/2}$.

19. The method of claim 17, wherein a charge passed through value of the mortar measured using ASTM C1202 is less than 200 coulombs after a curing period of 28 days.

20. The method of claim 17, wherein a non-steady state chloride migration coefficient of the mortar based on NT Build 492 tests is less than $5\times10^{12}$ $m^2$/s after a curing period of 28 days.

21. A cement composition including:

ordinary Portland cement;

a secondary cementitious material (SCM) including one or more of metakaolin, limestone, or gypsum in an amount up to approximately 70% of a replacement level of ordinary Portland cement;

a superplasticizer in a concentration range of between approximately 0.05% by weight of cement (bwoc) and 2% bwoc; and aggregates of mesoporous carbon nanoparticles (3DG carbons) in an amount of between approximately 0.05% bwoc and 2% bwoc, wherein the 3DG carbons include one or more interconnected bundles of electrically conductive graphene layers and include oxygen containing functional groups disposed on one or more of the surfaces of the 3DG carbons or within the 3DG carbons.

\* \* \* \* \*